United States Patent [19]

Ishiwata et al.

[11] Patent Number: 5,390,001
[45] Date of Patent: Feb. 14, 1995

[54] PHOTOSENSITIVE MATERIAL PRINTING APPARATUS

[75] Inventors: Toshimitsu Ishiwata; Hiroki Sutoh; Shin-ichi Yabe; Hiroshi Kawaguchi, all of Kanagawa, Japan

[73] Assignee: Fuji Photo Film Co., Ltd., Kanagawa, Japan

[21] Appl. No.: 913,813

[22] Filed: Jul. 16, 1992

[30] Foreign Application Priority Data

Jul. 16, 1991 [JP] Japan .................. 3-175562
Apr. 3, 1992 [JP] Japan .................. 4-082304

[51] Int. Cl.⁶ ............................................. G03B 27/04
[52] U.S. Cl. ..................................... 355/85; 355/72; 355/75; 355/99
[58] Field of Search ............... 355/85, 86, 53, 95, 355/99, 88, 41, 75, 72

[56] References Cited

U.S. PATENT DOCUMENTS

| | | | |
|---|---|---|---|
| 3,873,202 | 4/1974 | Inoue | 355/88 |
| 4,142,794 | 3/1979 | Trump | 355/92 |
| 4,372,677 | 11/1981 | Horner | 355/41 |
| 4,435,076 | 6/1982 | Tatsunosuke | 355/41 |
| 4,489,652 | 12/1984 | Takeuchi et al. | 101/211 |
| 4,533,239 | 8/1985 | Back | 355/72 |
| 4,594,868 | 6/1986 | Takeuchi et al. | 72/12 |
| 4,916,482 | 2/1989 | Nishida | 355/75 |

*Primary Examiner*—Richard A. Wintercorn
*Attorney, Agent, or Firm*—Sughrue, Mion, Zinn, Macpeak & Seas

[57] ABSTRACT

A photosensitive material printing apparatus equipped with a printing portion for printing images of an original film onto a photosensitive material. The photosensitive material printing apparatus is equipped with a holding device for holding the original film at a predetermined position of the printing portion, a moving device for moving the holding device along a photosensitive surface of the photosensitive material, an input board for inputting an amount of movement of the holding device, and a control device for controlling the moving device to move the holding device based on the amount of movement inputted by the input board. Accordingly, the amount of movement of the holding device can be adjusted via the input board.

24 Claims, 24 Drawing Sheets

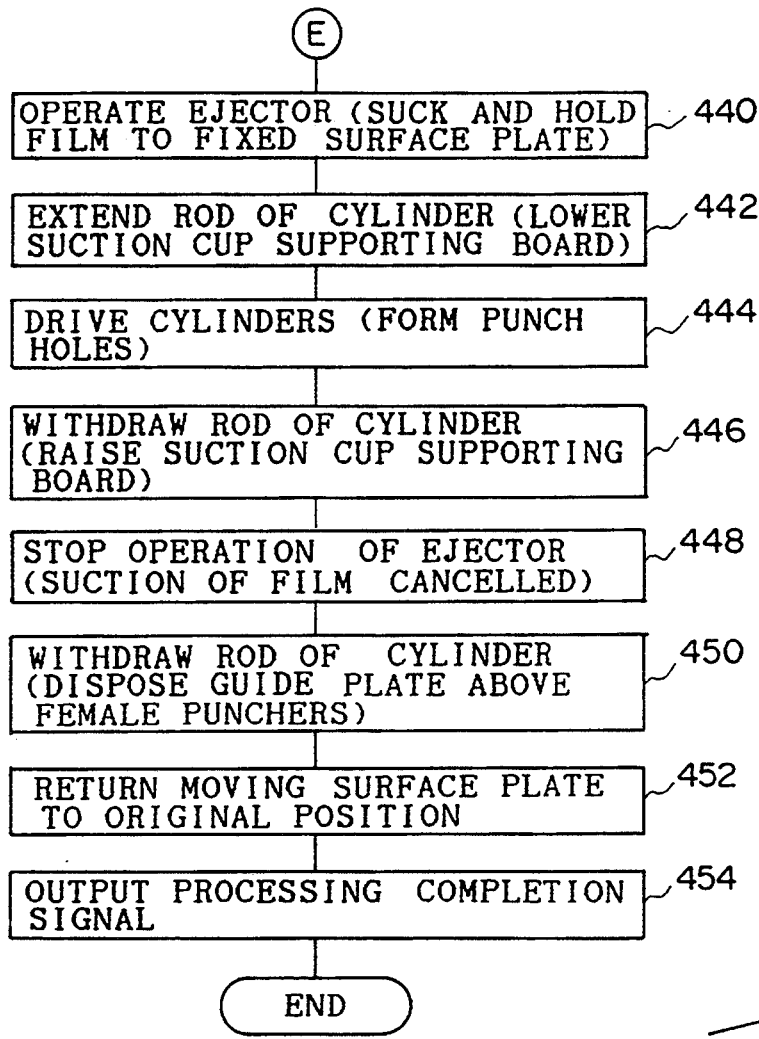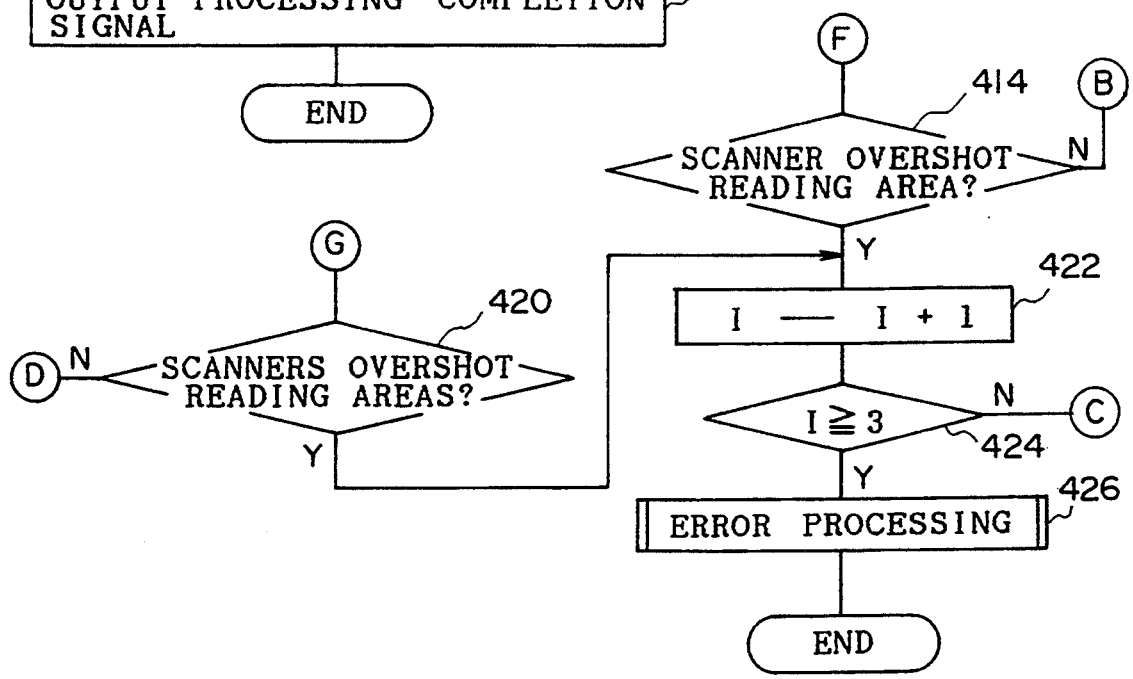

PHOTOSENSITIVE MATERIAL PRINTING APPARATUS

BACKGROUND OF THE INVENTION

1. Field of the Invention

The present invention relates to a photosensitive material printing apparatus in which images recorded on an original film are printed onto a photosensitive material, and especially to a photosensitive material printing apparatus in which the original film is maintained at a predetermined position with respect to the photosensitive material so as to print the images on the original film at a predetermined position of the photosensitive material.

2. Description of the Related Art

Images recorded on an original film (e.g., a negative film) are printed by a photosensitive material printing apparatus (hereinafter referred to as "plate material printing apparatus") onto a photosensitive material (hereinafter referred to as "PS plate"). Examples of photosensitive material include a lithographic printing plate, which is used at a rotary press or the like used in printing newspapers, and a color photograph photosensitive material, which is used in producing color proofs, and the like.

A surface plate is disposed at a printing portion of the plate material printing apparatus. The PS plate, which is supplied to the printing apparatus by a PS plate supplying apparatus, is loaded at a predetermined position on the surface plate, At this time, the negative film is loaded while being registered to the predetermined position of the PS plate. As an example of this registration of the PS plate, convex portions, e.g., pins or the like, are provided at the surface plate or the like. Registration of the negative film is effected by the insertion of the convex portions into holes formed in advance in the negative film.

Deviation of printing position of an image on the PS plate for each printing apparatus from a standard printing position of the image on the PS plate is caused by either the displacement of the positions of the punch holes with respect to the image area on the original film (hereinafter referred to as "negative film") among printing apparatuses, or the placement of the positions of the positioning pins for the PS plate at the printing portion among printing apparatuses. The deviation is a drawback especially in color printing since the deviation becomes out of registration in colors.

Namely, extreme precision is required in order to accurately print the images at the predetermined positions on the PS plate. After the negative film is loaded onto the PS plate, it is necessary to finely adjust the position of the negative film in accordance with the deviation of each printing apparatus. Especially in color printing in which the images of negative films are color separated images, e.g., four colors of yellow, magenta, cyan, and black, the color separated images of the four colors are printed separately for each color image onto the PS plate. However, because of the deviation of the printing position of the images among printing apparatus, out of registration in color occurs when printing is effected at separate printing apparatuses.

Namely, when images of a plurality of negative films, which are separated for each color, are printed in parallel by using a plurality of plate material printing apparatuses, the printing of the images of the negative films onto the PS plate can be carried out quickly. In this case, registration of the negative films at each of the plate material printing apparatuses is extremely difficult due to the deviation of the printing position of each printing apparatus.

Further, when the above-mentioned punch holes of the negative film are formed as references for the edges of the negative film, there is often displacement of the image area with respect to the edges. Moreover, displacement arises due to differences in the positions of the punchers among printing apparatuses, which is a factor in out of registration in color especially in color printing.

The space between images when two or more images are printed onto one PS plate, i.e., the photocomposition pitch, differs for each user. Ordinarily, when the plate material printing apparatus is installed, the photocomposition pitch is adjusted.

There are differences, to a certain degree, in the accuracy of positioning of the PS plate in the printing portions of plate material printing apparatus. There are also differences in the position of punch holes formed in the negative film for each printing apparatus. Therefore, even if registration at the printing portion is carried out for each plate material printing apparatus, deviation in the position of an image printed on the PS plate from the standard position of the image on the PS plate arises. This deviation results in out of registration in the finished color print. In order to prevent out of registration of color images and the like, it is necessary to print the images, separated into four colors from one color image, onto the PS plate by the use of a single plate material printing apparatus. However, when this type of method is used for printing, printing work becomes less efficient, Further, the plate material printing apparatus is generally not equipped with a special function for regulating the photocomposition pitch, and adjustment of the photocomposition pitch is not easily carried out.

SUMMARY OF THE INVENTION

With the aforementioned in view, an object of the present invention is to provide a photosensitive material printing apparatus in which an image recorded on an original film can be accurately printed at a predetermined position on the photosensitive material, and in which the printing position can be easily adjusted.

In a first embodiment of the present invention, a photosensitive material printing apparatus is equipped with a printing portion for printing an image of an original film onto a photosensitive material, wherein the photosensitive material printing apparatus comprises a holding means for holding the original film at a predetermined position of the printing portion, a moving means for moving the holding means along a photosensitive surface of the photosensitive material, an input means for inputting an amount of movement of the holding means, and a control means for controlling the moving means to move the holding means based on the amount of movement input by the input means.

In the photosensitive material printing apparatus of the first embodiment with the above structure, the original film is positioned and held by the holding means with respect to the photosensitive material positioned at the printing portion, and is placed by the holding means onto the photosensitive material.

The holding means is movable, based on the amount of input by the input means, along the photosensitive surface of the photosensitive material. In this way, the original film held by the holding means can be made to correspond to an arbitrary position of the photosensitive material. The image can thereby be printed at an arbitrary position of the photosensitive material. For example, when images of two sheets of the original films are printed on a photosensitive lithographic printing plate of a size of two newspaper pages, which serves as a photosensitive material, the space between the images, i.e., the photocomposition pitch, is made constant. This photocomposition pitch is input to the control means. After printing has been completed for the first image, when the holding means is moved by the moving means, the next image can be printed at an arbitrary photocomposition pitch.

In a second embodiment of the present invention, a photosensitive material printing apparatus is equipped with a printing portion for printing an image of an original film onto a photosensitive material, wherein the photosensitive material printing apparatus comprises a holding means for holding the original film at a predetermined position of the printing portion, a moving means for moving the holding means along a photosensitive surface of the photosensitive material, and a control means for controlling the moving means to move the holding means based on an amount of deviation of the position, experimentally obtained in advance, of the image on the photosensitive material from a standard printing position of the image on the photosensitive material.

The deviation of the image on the photosensitive material at the printing portion is caused by the displacement of the positioning pins for the photosensitive material.

In the photosensitive material printing apparatus of the present embodiment, the holding means is moved in accordance with the deviation of the printing position of the image from a standard printing position, Accordingly, differences among apparatuses can be regulated.

Namely, the holding means of the photosensitive material printing apparatus of the present invention can be moved in advance in accordance with the deviation of the position of the image to be printed, which has been experimentally obtained in advance, by using different photosensitive material printing apparatuses from the standard position of the image to be printed, The differences among these photosensitive material printing apparatuses can thereby be substantially eliminated. In this way, a plurality of original films which are color separated from the same color image can be printed simultaneously using different photosensitive material printing apparatuses.

In the above first and second embodiments, the holding means may be at least two positioning pins which are tightly inserted respectively into at least two through-holes spaced at fixed intervals and provided so as to correspond to the image area of the original film.

In this case, reference pins are inserted into at least two through-holes, which are formed at fixed intervals in the original film, so as to hold the original film. The placement of the original film with respect to the reference pins is determined by the reference pins being inserted tightly into the at least two through-holes. When the reference pins are positioned with respect to the photosensitive material, the position of the original film with respect to the photosensitive material is determined.

The reference pins are provided so as to correspond to the through-holes. The through-holes may be provided in at least two positions which correspond to the image area of the original film. Further, the through-holes provided in the original film may be punched in advance, or may be punched at the photosensitive material printing apparatus so as to correspond to the image area recorded on the original film.

In this case, when the through-holes of the original film are punched at the correct positions, i.e., standard positions, with regard to the image area of the original film, the image of the original film can be printed at the correct position on the photosensitive material if the photosensitive material is correctly positioned at the printing portion by the positioning pins for the photosensitive material.

In a third embodiment of the present invention, a photosensitive material printing apparatus is equipped with a printing portion for printing, onto a photosensitive material, an image recorded on an original film, on which the image and at least one index showing the image area are recorded. The photosensitive material printing apparatus includes a loading plate disposed upstream of the printing portion and on which the original film is loaded before being transported to the printing portion, a loading plate moving means for moving at least one portion of the loading plate, with the original film loaded thereon, in horizontal directions, a detecting means for detecting the at least one index of the original film on the loading plate, a loading plate moving means control means for controlling the loading plate moving means based on the at least one index of the original film detected by the detecting means, and positioning the original film at a predetermined position, and a punching means, provided on or adjacent to the loading plate, for punching punch holes in the original film positioned at the predetermined position.

In the present embodiment, the loading plate is provided upstream of the printing portion. The original film to be transported to the printing portion is loaded on the loading plate. Further, the punching means is provided on or adjacent to the loading plate so as to punch punch holes in the loaded original film.

The detection means detects the positions of indices (so-called "register marks") recorded on the original film on the loading plate. From the results of this detection, the loading plate moving means control means calculates the deviation of the image area of the original film with respect to the position of the punching means from the standard image area of the original film with respect to the position of the punching means with reference to the register marks. The loading plate moving means control means controls the loading plate moving means based on the results of the calculation. At this time, the loading plate moving means moves at least one portion of the loading plate on which the original film is held.

The relative position of the register mark to the image area recorded on the original film is precisely defined so that the image area of the original film can exactly be determined.

The original film is moved by the loading plate moving means so that the image is disposed at a predetermined position with respect to the punching means. At the position, the punching means punches punch holes in the original film.

In this way, the punch holes are precisely formed in the original film at predetermined positions with respect to the image. In this case, the loading plate moving means is operated by taking into account the differences in the position of the punching means among apparatuses experimentally obtained in advance, and the mutual differences among apparatuses can be eliminated. In other words, the position of the punch holes of the original film is exactly positioned to the image area even when different printing apparatuses are used. When color images are printed, out of registration in colors can be eliminated, and a high quality of print can be obtained.

In the above-described third embodiment, the loading plate is equipped with a movable portion, which is positioned at a central portion of the loading plate, and a fixed portion, which is positioned at a peripheral portion of the loading plate. The punching means is provided at the fixed portion, and the movable portion is moved with respect to the fixed portion by the loading-plate moving means. In this case, the central portion of the loading plate is moved by the loading plate moving means. The punching means is disposed at the fixed portion of the loading plate. By the movable portion moving with the original film being held thereon, the images of the original film can be moved to predetermined positions with respect to the punching means.

Further, in the third embodiment, a pressing means formed by an elastic body is provided above the loading plate so as to be disposed parallel to an upper surface of the loading plate. A substantially entire surface of the original film is interposed between the loading plate and the pressing means by a downward movement of the pressing means. Namely, a pressing means formed by an elastic body is provided. The original film loaded on the loading plate is pressed by the pressing means so as to be interposed between the pressing means and the loading plate. In this way, an original film which is curled, folded, warped or the like can be flattened on the loading plate so that error in detecting the index by the detecting means or error in the position of punching by the punching means is eliminated.

Moreover, the pressing means can be provided at a transporting means which transports the original film onto the loading plate. The transporting means positions the original film above the loading plate when transporting the original film onto the loading plate and when taking the original film from the surface of the loading plate. It suffices to provide one of these transporting means at the pressing means so that the apparatus can be operated efficiently.

The photosensitive material printing apparatus of the third embodiment can also include a holding means for holding the original film at a predetermined position of the printing portion, a moving means for moving the holding means along a photosensitive surface of the photosensitive material, an input means for inputting an amount of movement of the holding means, and a control means for operating the moving means to move the holding means based on the amount of movement input by the input means. Accordingly, the holding means is moved so that the photocomposition pitch can be set. The holding means maintains a fixed position with respect to the image recorded on the original film. Therefore, by moving the holding means, printing can be effected at an correct photocomposition pitch.

The fourth embodiment of the present invention is a photosensitive material printing apparatus equipped with a printing portion for printing, onto a photosensitive material, an image recorded on an original film, on which the image and at least one index showing the image area are recorded. The photosensitive material printing apparatus includes a loading plate disposed upstream of the printing portion and on which the original film is loaded before being transported to the printing portion, a punching means provided on or adjacent to the loading plate and punching punch holes in the original film on the loading plate, a relative moving means for moving in horizontal directions at least one of at least one portion of the loading plate and the punching means so as to relatively move the at least one portion of the loading plate and the punching means, a detecting means for detecting the at least one index of the original film on the loading plate, a relative moving means control means for controlling the relative moving means based on the at least one index of the original film detected by the detecting means and positioning the original film at a predetermined position, a punching means operating means for operating the punching means to punch punch holes in the original film positioned at the predetermined position, and a holding means having positioning pins, wherein the positioning pins are inserted in the punch holes punched in the original film so that the original film is held at a fixed position of the printing portion.

In the photosensitive material printing apparatus of the present embodiment, after the original film is loaded on and held at the loading plate, the at least one index of the original film are detected by the detecting means. From the results of this detection, the relative moving means control means calculates the deviation of the image area of the original film with respect to the position of the punching means from the standard image area of the original film with respect to the position of the punching means with reference to the register marks. Further, the relative moving means control means controls the movement of the relative moving means based on the amounts of the deviation. At this time, the relative moving means relatively moves the punching means and at least one portion of the loading plate. At least one of at least one portion of the loading plate and the punching means moves so that the image of the original film is positioned at a predetermined position with respect to the punching means.

The positioning pins of the holding means are inserted into the punch holes at the printing portion so that the original film is held. At the printing portion, the positioning pins inserted in the punch holes are positioned such that the image of the original film is at a predetermined position with regard to the position of the PS plate. In this way, registration of the original film at the printing portion can be effected easily.

BRIEF DESCRIPTION OF THE DRAWINGS

FIG. 23A to FIG. 23C are flowcharts illustrating operation of the punch hole forming portion relating to the second embodiment.

DESCRIPTION OF THE PREFERRED EMBODIMENTS

First Embodiment

A plate material printing apparatus 10 relating to the present embodiment will be described with reference to the drawings. In each figure, large arrows A through D illustrate the flow of an original film (hereinafter referred to as "negative film") 12. Large arrows E, F designate the flow of a photosensitive material (hereinafter referred to as "PS plate") 14. The negative film 12 is moved in a substantially horizontal state to each processing portion by an unillustrated transport mechanism.

Figure 1:
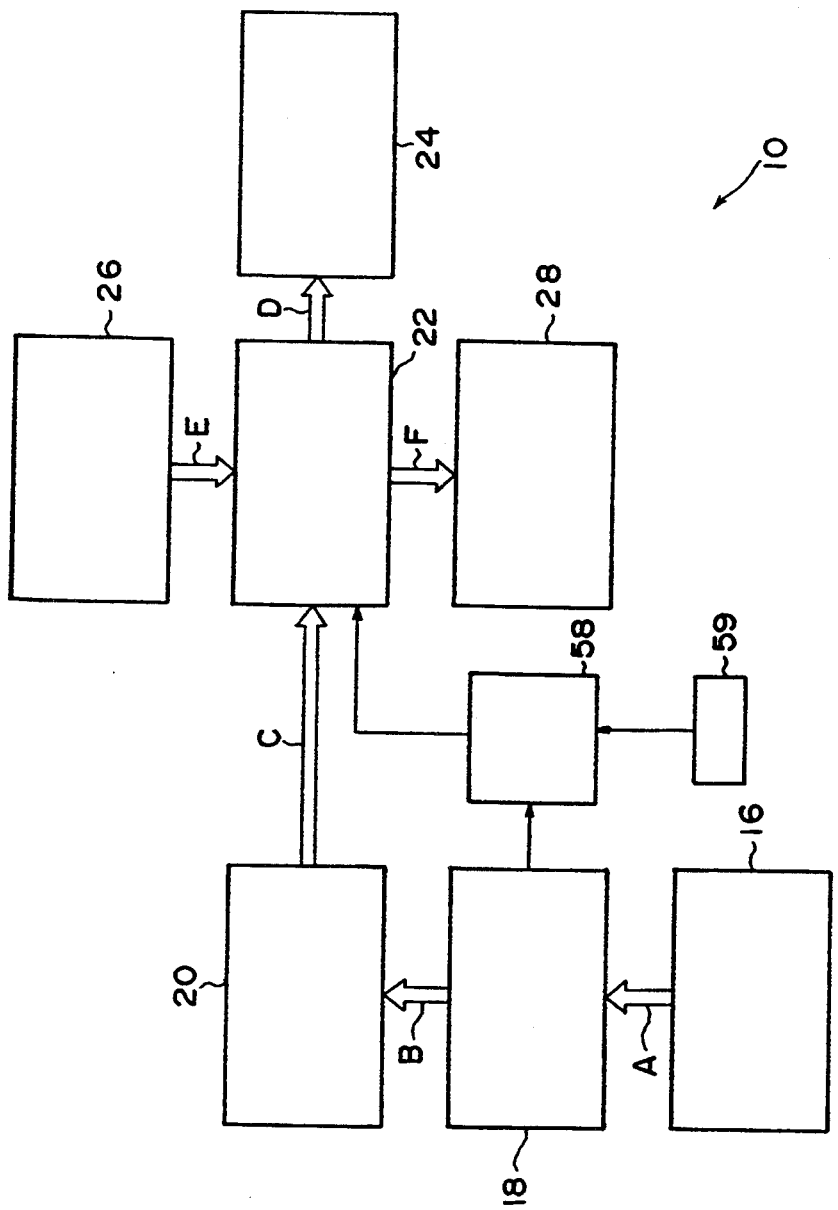
FIG. 1 is a schematic view of a plate material printing apparatus relating to a first embodiment.

FIG. 1 is a schematic view of the plate material printing apparatus 10 relating to the present embodiment.

The plate material printing apparatus 10 is formed by a stock portion 16, in which the negative film 12 upon which images are recorded is accommodated, a punching portion 18, in which reference positions of the negative film 12 are set, a negative film supplying portion 20, a printing portion 22, a stock portion 24, in which the negative film 12 for which printing has been completed is accommodated, a PS plate supplying portion 26, which supplies PS plates 14 to the printing portion 22, and a PS plate discharge portion 28, which discharges the PS plate 14 for which printing has been completed to the exterior of the plate material printing apparatus 10.

The negative film 12, in which punch holes 52A, 52B (shown in FIG. 2) have been punched at the punching portion 18, is transported into the negative film supplying portion 20 (the direction of arrow B in FIG. 1). The negative film 12 is transported from the negative film supplying portion 20 to the printing portion 22 (the direction of arrow C in FIG. 1).

The PS plate supplying portion 26 can supply the PS plates 14 by using an auto-feeder as described in Japanese Patent Application Laid-Open 63-106245 and Japanese Patent Application Laid-Open 63-171728, The PS plates 14, which are supplied from the exterior of the plate material printing apparatus 10, are received by the PS plate supplying portion 26 and are sent to the printing portion 22 (the direction of arrow E in FIG. 1).

The PS plates 14, which are supplied to the printing portion 22 from the PS plate supplying portion 26, are positioned and placed on a surface plate 60 provided at the printing portion 22. An end portion of the negative film 12, which is supplied from the negative film supplying portion 20, is maintained on the PS plate 14 by a maintaining portion 62, and is placed at a predetermined position on the PS plate 14.

Figure 12:
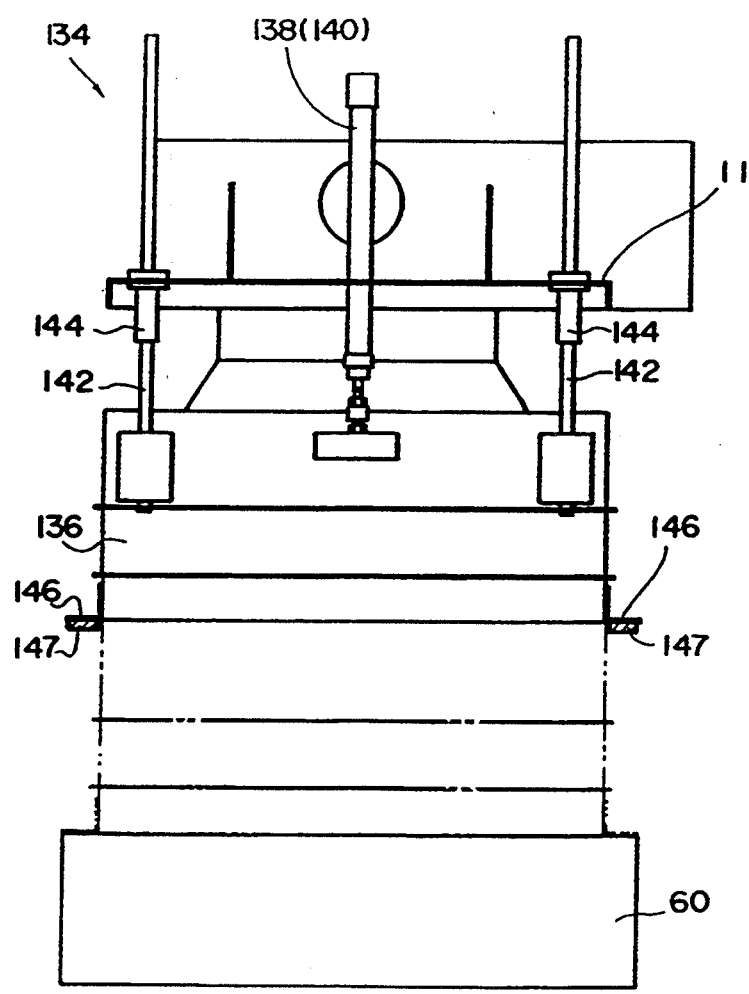
FIG. 12 is a side view of main portions illustrating a positional relationship of a light source and a surface plate of the printing portion.

In this state, light is irradiated from above by a lamp or the like of a light source 134 (shown in FIG. 12). The images recorded on the negative film 12 are printed onto the PS plate 14.

After the images of the negative film 12 have been printed onto the PS plate 14, the negative film 12 is moved from the surface of the PS plate 14 to the stock portion 24. The PS plate 14 is discharged to the exterior from the PS plate discharge portion 28.

Unillustrated transport rollers are disposed in the PS plate discharge portion 28. The transport rollers discharge the PS plate 14, on which the images recorded on the negative film 12 have been printed, to the exterior of the plate material printing apparatus 10. A processing apparatus, such as that described in Japanese Utility Model Application Publication No. 60-35072 or Japanese Patent Application Publication 62-34429 or the like, can be connected after the PS plate discharge portion 28. A punching apparatus, a folding apparatus and the like can be connected after the processing apparatus. Further, the negative film 12, whose images have been printed onto the PS plate 14 at the printing portion 22, is transported into the stock portion 24 where it is accommodated as negative film 12 which has undergone printing processing.

Next, the negative film 12 used in the plate material printing apparatus 10 will be described.

Figure 2:
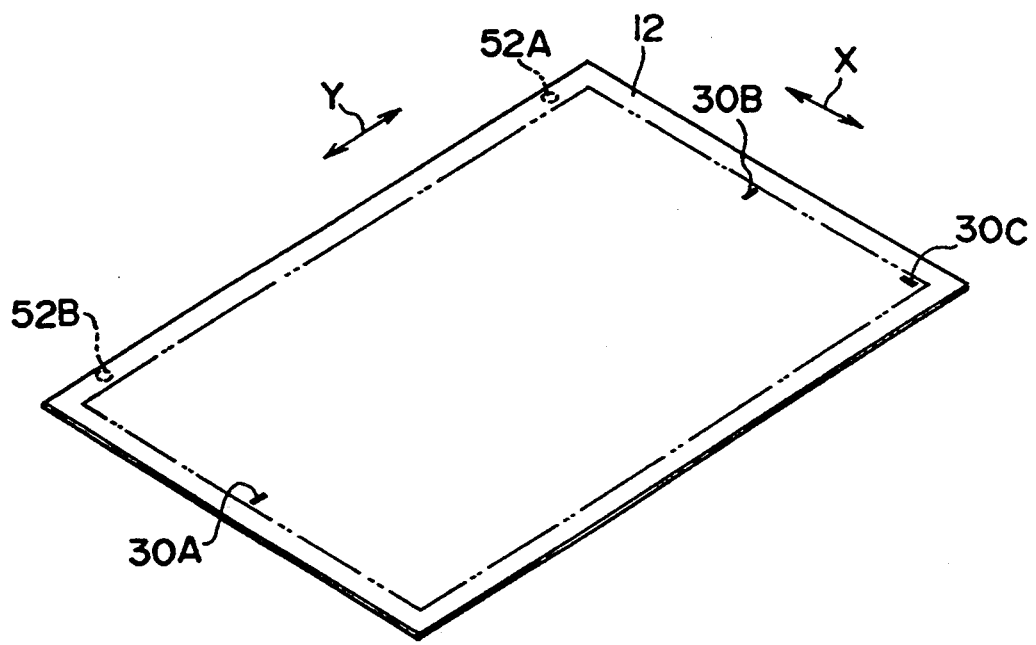
FIG. 2 is a perspective view illustrating a film relating to the first embodiment.

As shown in FIG. 2, an image is recorded onto the negative film 12 at a substantially central portion of a thin, transparent, flat supporting body (shown by the two-dot chain line in FIG. 2). Register marks 30A, 30B, 30C, which show the position of the image, are marked at a plurality of places at end portions of the recorded image.

The register marks 30A, 30B are marked along the vertical direction (the direction of arrow Y in FIG. 2) at respective end portions of the vertical direction of the negative film 12 so as to show the center of the image recorded on the negative film 12. The register mark 30C is marked along the transverse direction (the direction of arrow X in FIG. 2) at an upper end portion of the negative film 12 and at one end in the transverse direction of the negative film 12. The upper end of the image recorded on the negative film 12 is shown by the register mark 30C. The area of the image recorded on the negative film 12 can be known by the register marks 30A, 30B, 30C.

When printing onto the negative-type PS plate 14 is effected, the register marks 30A, 30B, 30C are not displayed on the printed matter due to masking. However, with a positive-type PS plate, the register marks 30A, 30B, 30C may remain on the printed matter.

Main portions of the plate material printing apparatus 10 will be described hereinafter. However, a part of the detailed explanation will be omitted. In each of the drawings referred to hereinafter, the directions of arrows X and Y respectively indicate the X direction (transverse direction) and the Y direction (vertical direction) of the negative film 12 disposed at each processing portion.

Stock Portion 16

Figure 3:
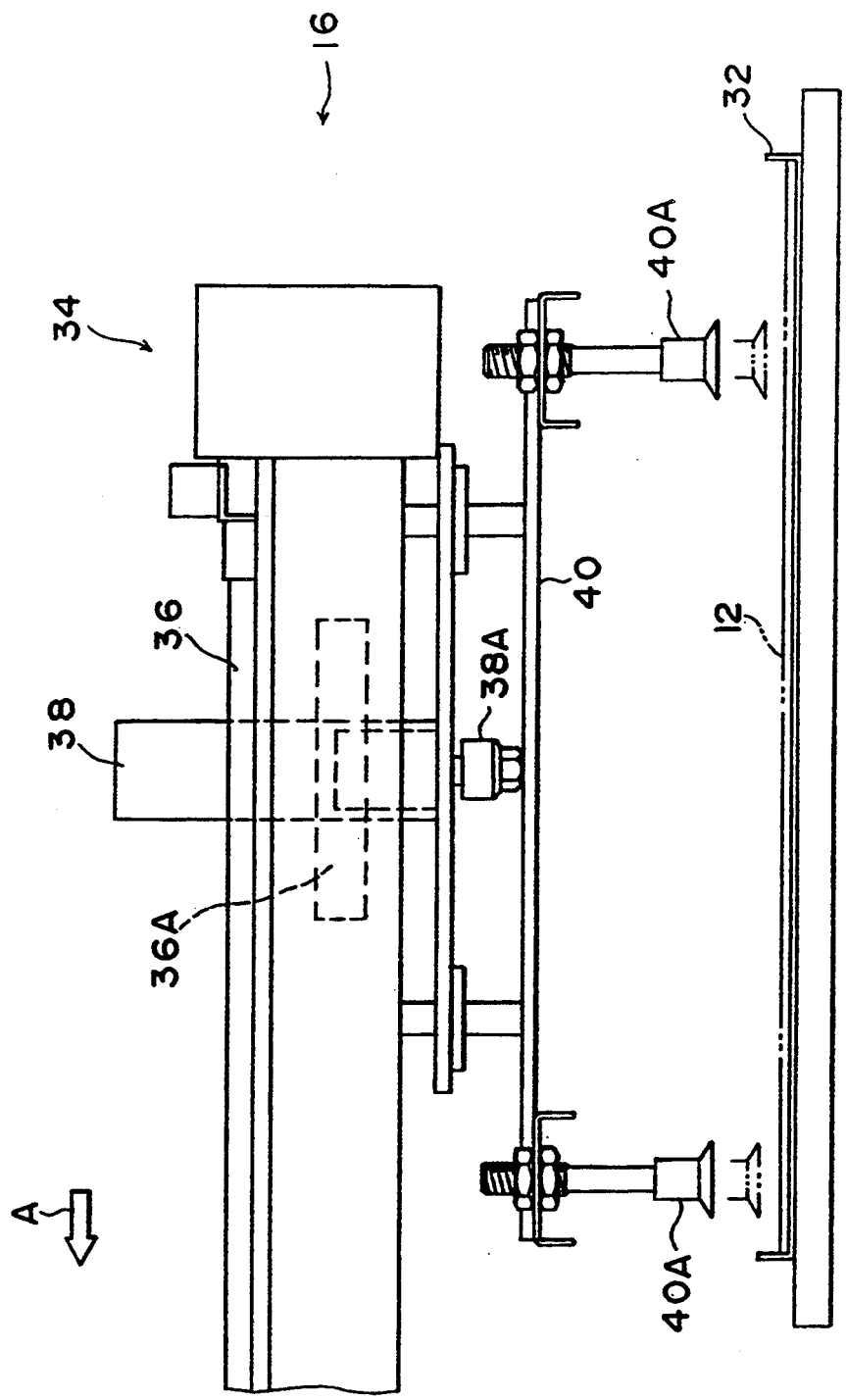
FIG. 3 is a side view illustrating a stock portion relating to the first embodiment.

As shown in FIG. 3, a plurality of negative films 12, whose images are to be printed onto the PS plates 14, can be accommodated in the stock portion 16 of the plate material printing apparatus 10. A tray 32, in which the negative films 12 are accommodated horizontally and in layers, is provided in the stock portion 16. The tray 32 is substantially the same size as the negative film 12. The negative films 12 are accommodated by the tray 32 such that side end portions of the negative films 12 are always aligned.

For example, as shown in FIG. 3, a transport device 34 for the negative film 12 is provided above the tray 32. In the transport device 34, a hanger 40 is provided at an end of a driving shaft 38A of an air cylinder 38, which is maintained at a driving portion 36A of a rodless cylinder 36. A plurality of suction cups 40A are disposed at ends of the hanger 40. An unillustrated negative pressure supplying means is connected to each of the suction cups 40A, The negative film 12 accommodated in the tray 32 is sucked by negative pressure being supplied to the suction cups 40h by the negative pressure supplying means. Further, the negative film 12 is transported substantially horizontally (in the direction of arrow A shown in FIG. 3) as the air cylinder 38 and the rodless cylinder 36 are driven.

Punching Portion 18

Figure 4:
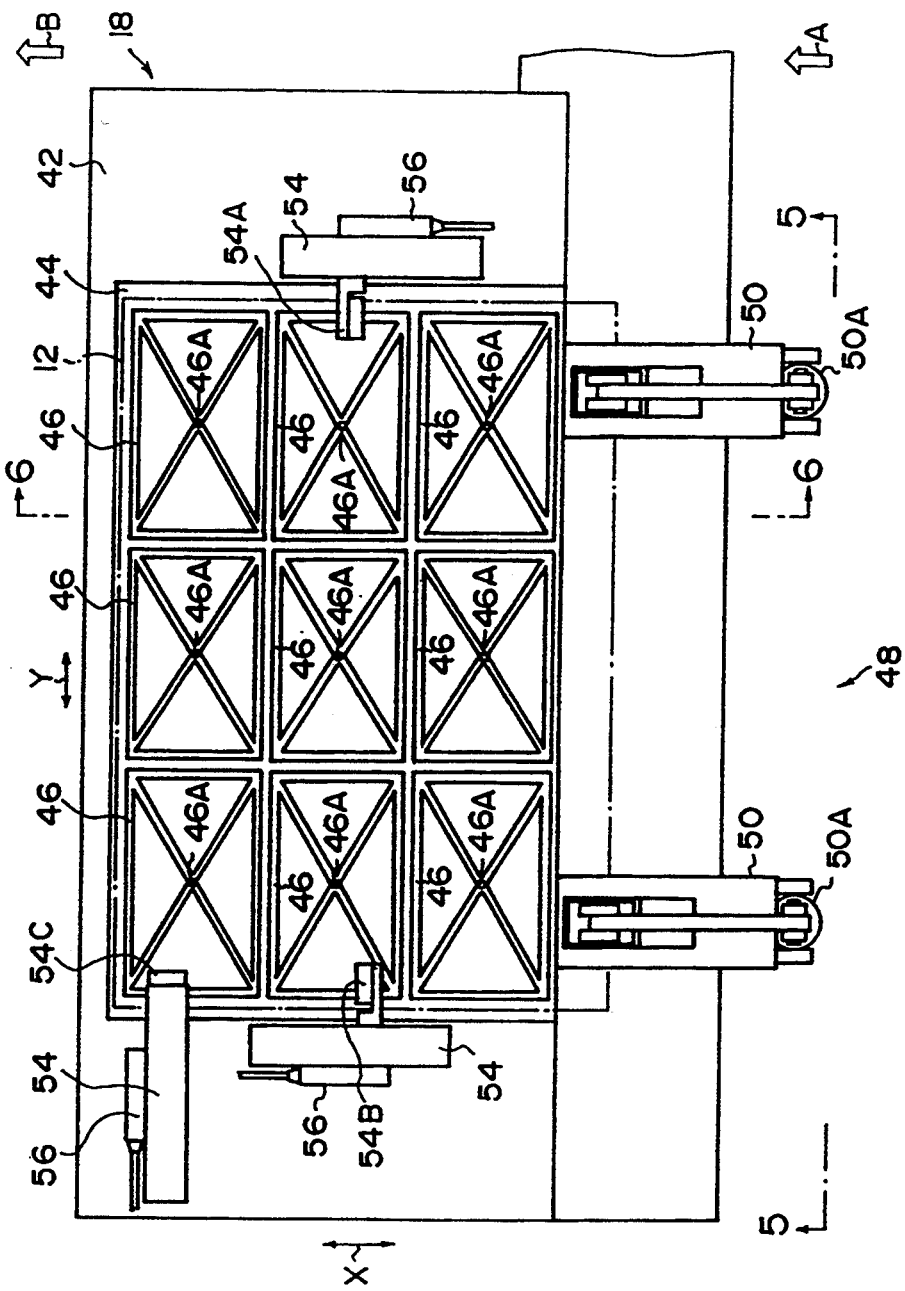
FIG. 4 is a plan view of main portions illustrating a reference setting means relating to the first embodiment.
Figure 5:
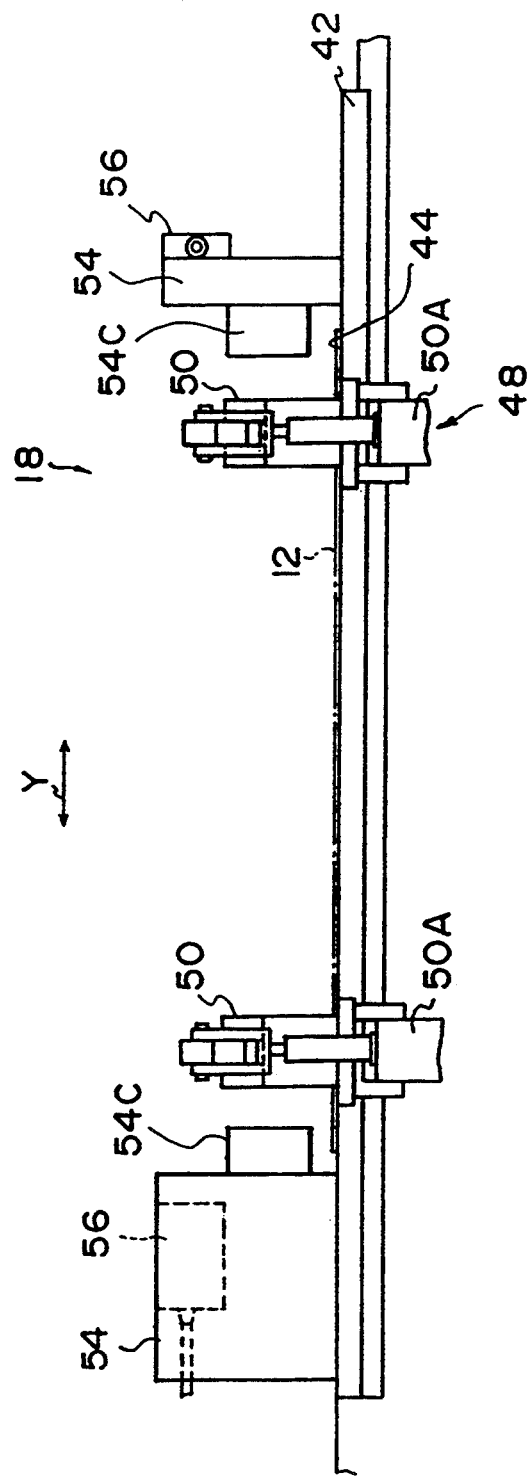
FIG. 5 is a side view taken along line 5—5 of FIG. 4.
Figure 6:
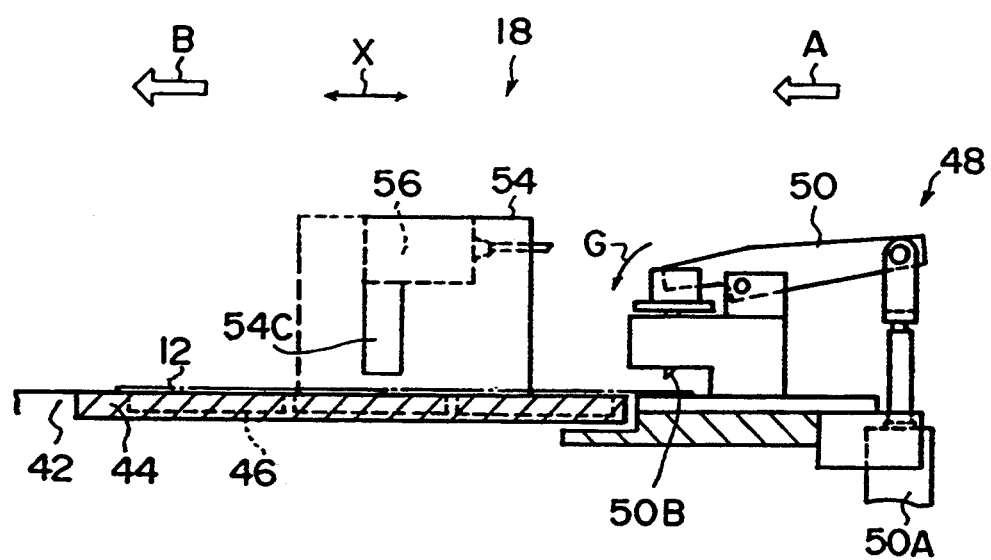
FIG. 6 is a cross-sectional view of main portions taken along line 6—6 of FIG. 4.

As shown in FIG, 1, the punching portion 18 is provided after the stock portion 16. As illustrated in FIGS. 4 through 6, a surface plate 44, onto which the negative film 12 is horizontally loaded, is provided at a substantially central portion of a base plate 42. A plurality of grooves 46 are formed on the top surface of the surface plate 44 so as to extend over substantially the entire surface of the surface plate 44. The grooves 46 are disposed in a rectangular configuration and are also formed as diagonal lines. Holes 46A are formed in centers formed by the intersection of the grooves 46 provided diagonally, An unillustrated negative pressure supplying means is connected to the holes 46A.

The portions, on which images are recorded, of the negative film 12 transported from the stock portion 16 are disposed at the portions of the surface plate 44 where the grooves 46 are formed. Further, one end in the transverse direction (the direction of arrow X in FIG. 4) of the negative film 12 projects from the surface plate 44. After the negative film 12 has been loaded on the surface plate 44, when negative pressure is applied by the negative pressure supplying means, the negative film 12 is sucked and fixed to the surface plate 44.

A punch portion 48 is disposed at a side of the surface plate 44. At the punch portion 48, the punch holes 52A, 52B, serving as reference positions, are formed in the negative film 12. The punch portion 48 opposes the end portion of the negative film 12 which projects from the surface plate 44, and is equipped with two punchers 50. An air cylinder 50A is provided in the puncher 50. By the driving of the air cylinder 50A, a punch tooth 50B is swung in the direction of arrow G in FIG. 6 and protrudes so as form holes in the negative film (as shown in FIG. 2).

An unillustrated driving device is provided at the punch portion 48. The driving device can move each puncher 50 in the directions of arrow X and the directions of arrow Y as shown in FIG. 4 such that the distance between axial centers of the punch teeth 50B of the punchers 50 is constant.

Sensors 54A, 54B, 54C, which read, or detect, the positions of the register marks 30A, 30B, 30C marked on the negative film 12, are mounted respectively to stands 54 so as to be disposed above end portions of the surface plate 44. The sensor 54A is disposed at a substantially central portion of the stock portion 16 side of the surface plate 44. The sensor 54B is provided at a substantially central portion of the negative film supplying portion 20 side of the surface plate 44. The sensor 54C is disposed at the negative film supplying portion 20 side of the surface plate 44 at a vicinity of an end portion of the side opposite the punch portion 48.

The stands 54 of the sensors 54A, 54B, 54C are mounted to ones of ends of cylinders 56, whose respective other ends are fixed. Each stand 54 is moved along the surface plate 44, which is on top of the base plate 42, by the driving of the respective cylinder 56. By the moving of the stands 54, the sensors 54A, 54B, 54C are moved along the surface of the negative film 12; the sensors 54A, 54B move along the transverse direction of the negative film 12, and the sensor 54C moves along the vertical direction of the negative film 12. The positions on the surface plate 44 of the register marks 30A, 30B, 30C are read by the sensors 54A, 54B, 54C. Accordingly, the area of the image recorded on the negative film 12 can be known.

The two punchers 50 of the punch portion 48 are moved by a moving device in correspondence with the image area of the negative film 12. The punch holes 52A, 52B are formed so as to correspond to the image area of the negative film 12. The moving device may be structured in a similar way as a moving device 63 of the printing portion 22 which will be described later.

In the present embodiment, the center of the image is indicated by the register marks 30A, 30B, and the upper edge of the recorded image can be known by the register mark 30C. However, the present invention is not limited to the same. It suffices that the register marks 30A, 30B, 30C precisely show the area of the image recorded on the negative film 12, and that the sensors are disposed so as to correspond to the register marks.

Printing Portion 22

Figure 7:
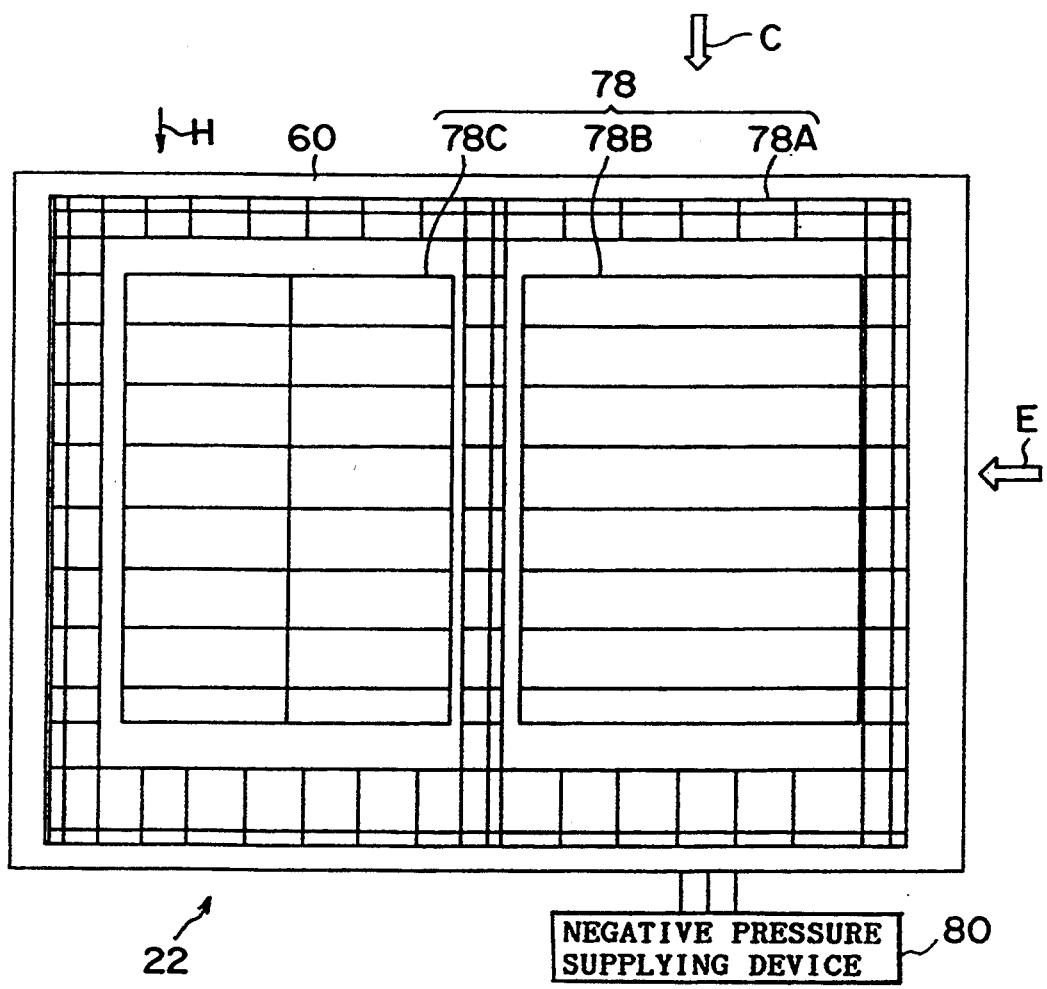
FIG. 7 is a plan view of main portions of a printing portion relating to the first embodiment.

As shown in FIG. 7, suction grooves 78 are formed in the top surface of the surface plate 60 of the printing portion 22. The suction grooves 78 are formed of first suction grooves 78A, which are formed so as to be connected at outer peripheral end portions and at an intermediate portion of the top surface of the surface plate 60, and second and third suction grooves 78B, 78C, which are surrounded by the first suction grooves 78A.

The first, second and third suction grooves 78A, 78B, 78C are respectively connected to a negative pressure supplying device 80. Negative pressure can be supplied independently to each of the first, second, and third suction grooves 78A, 78B, 78C. Accordingly, the PS plate 14 loaded on the surface plate 60 is sucked and fixed thereto.

The suction grooves 78 are formed into three systems. Therefore, as shown as an example in FIG. 8, for a PS plate 14 of the size of two newspaper pages, it suffices that negative pressure is supplied only to the suction grooves 78C. Even if the negative film 12 is loaded on the surface plate 60, the negative film 12 is not sucked to the surface plate 60. When the PS plate 14 is large (i.e., a printing plate of the size of four newspaper pages), negative pressure is supplied to all of the suction grooves 78A, 78B, 78C.

Next, the positioning of the PS plate 14 at the printing portion 22 will be described. The PS plate 14, which is supplied from the PS plate supplying portion 26 and loaded onto the surface plate 60, is moved to a predetermined position on the surface plate 60 by an unillustrated transport mechanism such as suction cups or the like. Thereafter, positioning, which will be described hereinafter, is effected.

The positioning device which positions the PS plate 14 is equipped with a pushing means, which pushes and moves the PS plate 14, and a positioning mechanism, which abuts end surfaces of the PS plate 14, which is being moved, so as to position the PS plate 14 at a predetermined position.

Figure 8:
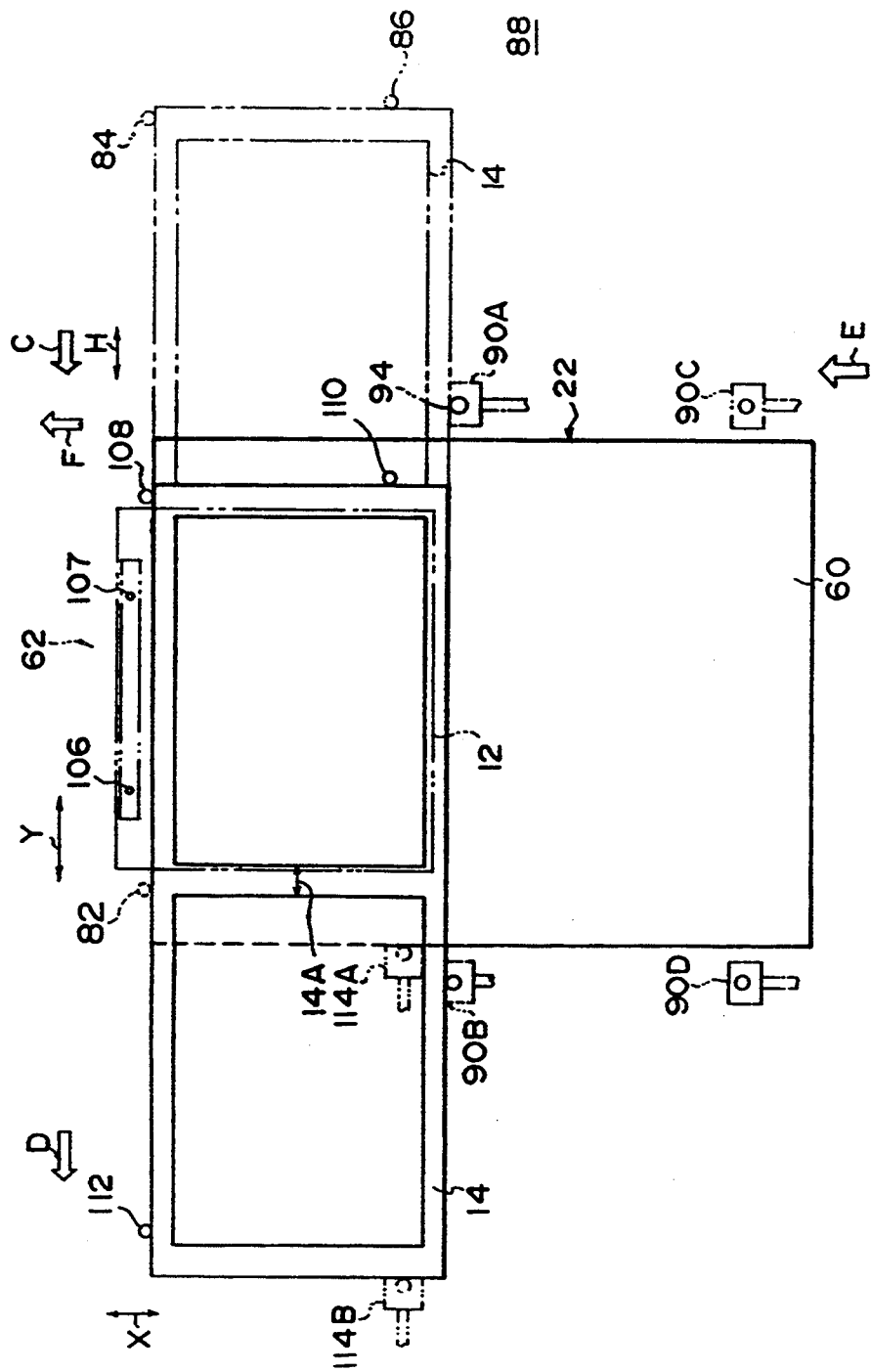
FIG. 8 is a plan view of main portions illustrating positioning of a PS plate at the printing portion.

FIG. 8 illustrates a case in which a PS plate 14 of the size of two newspaper pages is positioned. A surface plate reference pin 82, which positions the PS plate 14 in the transverse direction, is provided at a side surface of the surface plate 60 at the front side in the direction of insertion of the PS plate 14 (the direction of arrow E in FIG. 8). The surface plate reference pin 82 can rise above and fall below the upper surface of the surface plate 60. Further, off surface plate reference pins 84, 86 are provided in a base 88 at sides of the surface plate 66.

Positioning is effected by the tip end portions of the surface plate reference pin 82 and the off surface plate reference pin 84 abutting the front side of the PS plate 14, i.e., the front edge inserted from the direction of arrow E. Further, positioning is effected in the vertical direction (the direction orthogonal to the direction of insertion of the PS plate 14 onto the surface plate 60) by the abutment of the PS plate 14 and the off surface plate reference pin 86. At the plate surface of the left side of the paper surface as shown in FIG. 8, the negative film 12 is fit to the PS plate 14, which is positioned by the surface plate reference pin 82 and the off surface plate reference pins 84, 86, and is exposed.

Thereafter, the PS plate 14 is moved in the direction of arrow H by an unillustrated transport mechanism. Surface plate reference pins 108, 110, which can rise above and fall below the upper surface of the surface plate 60, are provided at side surfaces of the surface plate 60. Further, an off surface plate reference pin 112, which can rise above and fall below the upper surface of the surface plate 60, is provided at the negative film supplying portion 20 side of the surface plate 60. When the PS plate 14 is discharged, the off surface plate reference pin 112 falls below the upper surface of the surface plate 60.

After being moved in the direction of arrow H, the PS plate 14 abuts the surface plate reference pins 108, 110 and the off surface plate reference pin 112, and is positioned. Namely, the surface plate reference pins 108, 110 and the off surface plate reference pin 112 are used to position the PS plate 14 so that the images of the negative film 12 may be printed onto the plate surface of the right side of the PS plate 14.

The surface plate reference pins 82, 108, 110 and the off surface plate reference pins 84, 86, 112 are disposed so as to abut the PS plate 14 at the same positions during left side printing and right side printing. Further, the portion of the PS plate 14 which projects from the surface plate 60 is maintained horizontally by an unillustrated guide plate or the like having the same height as the surface plate 60.

Next, the pushing means will be described. As shown in FIG. 8, pushers 90A, 90B, 90C, 90D are disposed around the surface plate 60. The pushers 90A, 90C push the PS plate 14 in the direction of the surface plate reference pin 82 and the off surface plate reference pins 84, 108 in order to effect positioning for printing of the plate surface of the left side of the PS plate 14. The pushers 90B, 90D push the PS plate 14 in the direction of the surface plate reference pin 108 and the off surface plate reference pin 112 in order to effect positioning for printing of the plate surface of the right side of the PS plate 14. Namely, the pushers 90A, 90B are used for pushing a PS plate 14 of the size of two newspaper pages. The pushers 90C, 90D are used for pushing a PS plate 14 of the size of four newspaper pages.

Pushers 114A and 114B are disposed around the surface plate 60. The pusher 114A abuts one side of the PS plate 14 in the vertical direction (the direction of arrow H in FIG. 8 and the direction opposite thereto). The pusher 114A pushes the PS plate 14 to the off surface plate reference pin 86. Positioning in the vertical directions for printing of the left side plate surface of the PS plate 14 is thereby effected. Further, the pusher 114B abuts one side of the PS plate 14 in the vertical direction, and pushes the PS plate 14 to the surface plate reference pin 110. Positioning in the vertical directions for printing of the right side plate surface of the PS plate 14 is thereby effected.

The pushers 90A, 90B, 90C, 90D, 114A, 114B are each driven by an unillustrated air cylinder or the like.

Next, the registering of the negative film 12 to the PS plate 14, which is positioned and loaded on the surface plate 60, will be described.

As shown in FIG. 8, the maintaining portion 62, which maintains the negative film on the PS plate 14, and the moving device 63, which is beneath the maintaining portion 62, are disposed in a vicinity of the surface plate 60 between the surface plate reference pins 82, 108.

Figure 10:
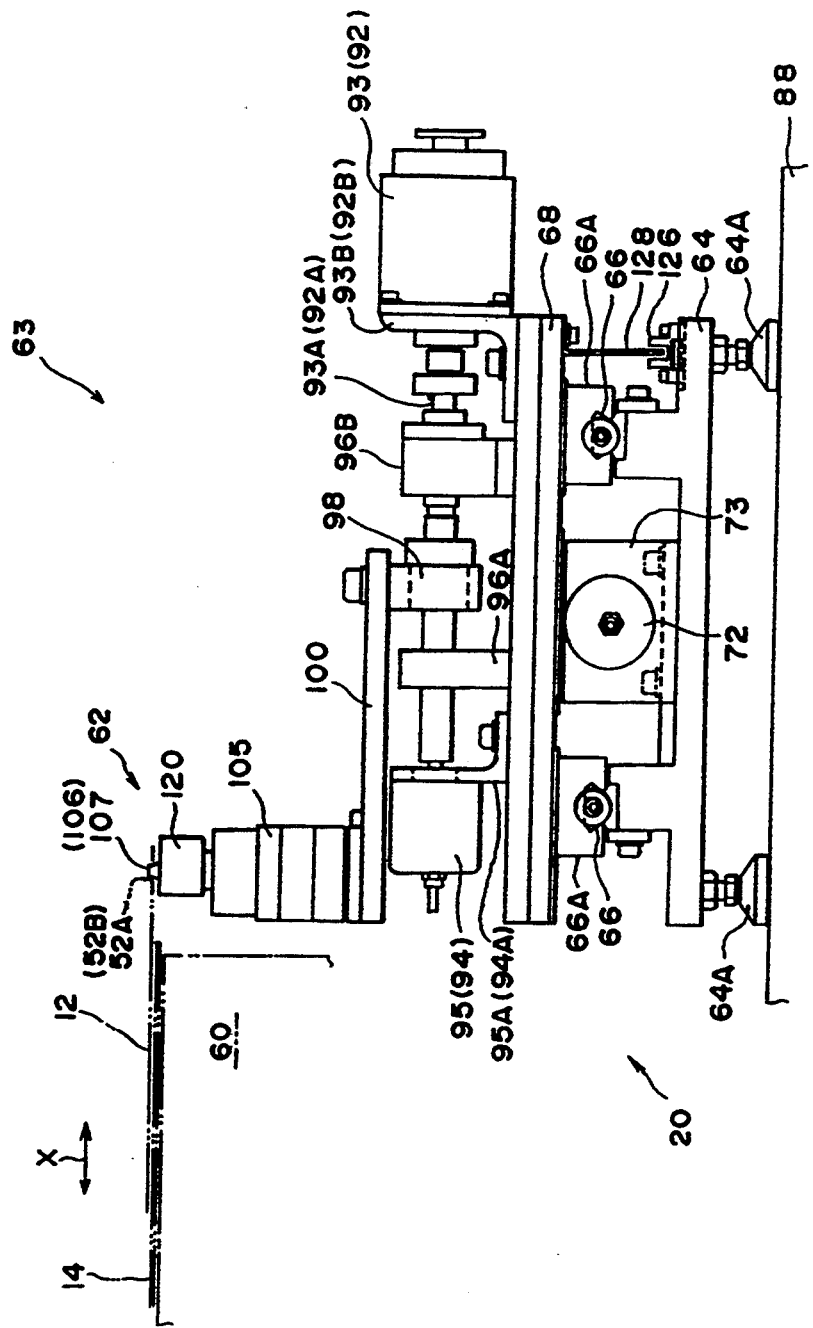
FIG. 10 is a side view taken along line 10—10 of FIG. 9.
Figure 11:
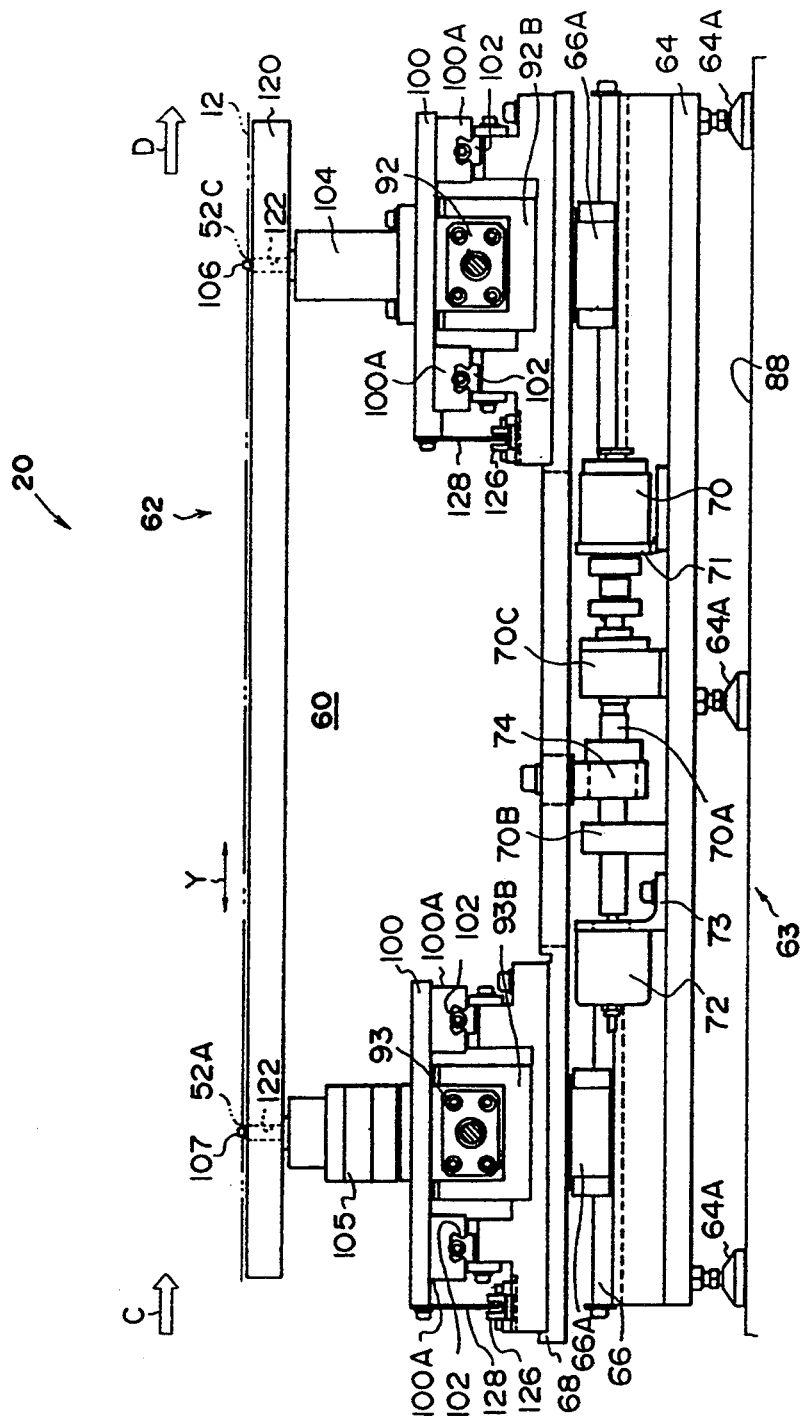
FIG. 11 is a side view taken along line 11—11 of FIG. 9.

As shown in FIGS. 10 and 11, a base plate 64, which is fixed to a base 88 of the printing portion 22 by a plurality of leg portions 64A, is disposed in the moving device 63. The height of each of the leg portions 64A is adjustable. Accordingly, the maintaining portion 62 and the moving device 63 are respectively in horizontal states.

A pair of parallel guide rails 66 is disposed at the base plate 64. A moving plate 68 is disposed at the guide rails 66 so as to be slidable along the guide rails 66 via linear bearings 66A. The moving plate 68 is disposed so as to span between both end portions in the axial direction of the pair of guide rails 66.

A stepping motor 70 and an encoder 72 are mounted to the base plate 64 by brackets 71, 73 respectively. A driving shaft 70A of the stepping motor 70 is parallel to the axes of the pair of guide rails 66. The encoder is connected to an end of the driving shaft 70A. An intermediate portion of the driving shaft 70A of the stepping motor 70 is axially supported by a pair of bearings 70B, 70C fixed to the base plate 64. A movable bracket 74, which is fixed to the moving plate 68, is provided between the pair of bearings 70B, 70C. The movable bracket 74 moves along the axis of the driving shaft 70A by the rotation of the driving shaft 70A. Namely, the stepping motor 70 is energized, and the driving shaft 70A is rotated in a predetermined direction. The movable bracket 74 is thereby moved along the driving shaft 70A in a direction of moving away from the stepping motor 70. Further, the movable bracket 74 is moved in the direction of the stepping motor 70 by the driving shaft 70A rotating in the direction opposite to the predetermined direction. The moving plate 68 is moved along with the movement of the movable bracket 74.

Stepping motors 92, 93 and encoders 94, 95, which are connected to respective ends of driving shafts 92A, 93A of the stepping motors 92, 93, are provided at the moving plate 68 at respective end portions in the directions of movement of the moving plate 68. The stepping motors 92, 93 and the encoders 94, 95 are fixed to the moving plate 68 by brackets 92B, 93B, 94A, 95A respectively.

Intermediate portions of the driving shafts 92A, 93A are each axially supported by a pair of bearings 96A, 96B. A movable bracket 98 is disposed between each pair of bearings 96A, 96B. A pin base 100 is fixed to each of the movable brackets 98. The pin bases 100 are supported so as to be slidable, via linear bearings 100A, along the driving shafts 92A, 93A on pairs of guide rails 102, which are disposed at both sides. The driving shafts 92A, 93A and the guide rails 102 are disposed orthogonally to the guide rails 66 of the base plate 64.

Pin brackets 104, 105, which are a part of the maintaining portion 62, are provided respectively at the pin bases 100 so as to project upwardly. Pins 106, 107 are provided so as to project from top ends of the pin brackets 104, 105 respectively. A pin bar 120 spans between the pins 106, 107. The pin bar 120 is bar-shaped, and through-holes 122 are formed therein at both end portions in the longitudinal direction. The pins 106, 107 are inserted into the through-holes 122 such that the distance between the axial centers of the pins 106, 107 is constant. The distance between the axial centers of the two through-holes 122, i.e., the distance between the axial centers of the pins 106, 107, is the same as the distance between the axial centers of the punch holes 52A, 52B formed in the negative film 12.

The top ends of the pins 106, 107 project from the through-holes 122 of the pin bar 120 such that the pins 106, 107 can be inserted into the punch holes 52A, 52B formed in the negative film 12. Further, the pin bar 120 is at approximately the same height as the top surface of the PS plate 14 loaded on the surface plate 60. The pin bracket 105 is slidable along the surface of the pin base 100. Accordingly, the pin bar 120 can move freely by the energizing of the stepping motors 70, 92, 93. The pin bar 120 can move in the X directions and Y directions of the negative film 12 so as to correspond to the punch holes 52A, 52B. By the moving of the pin bar 120, the portions of the negative film 12 on which images are recorded are disposed at predetermined positions on the PS plate 14.

Figure 9:
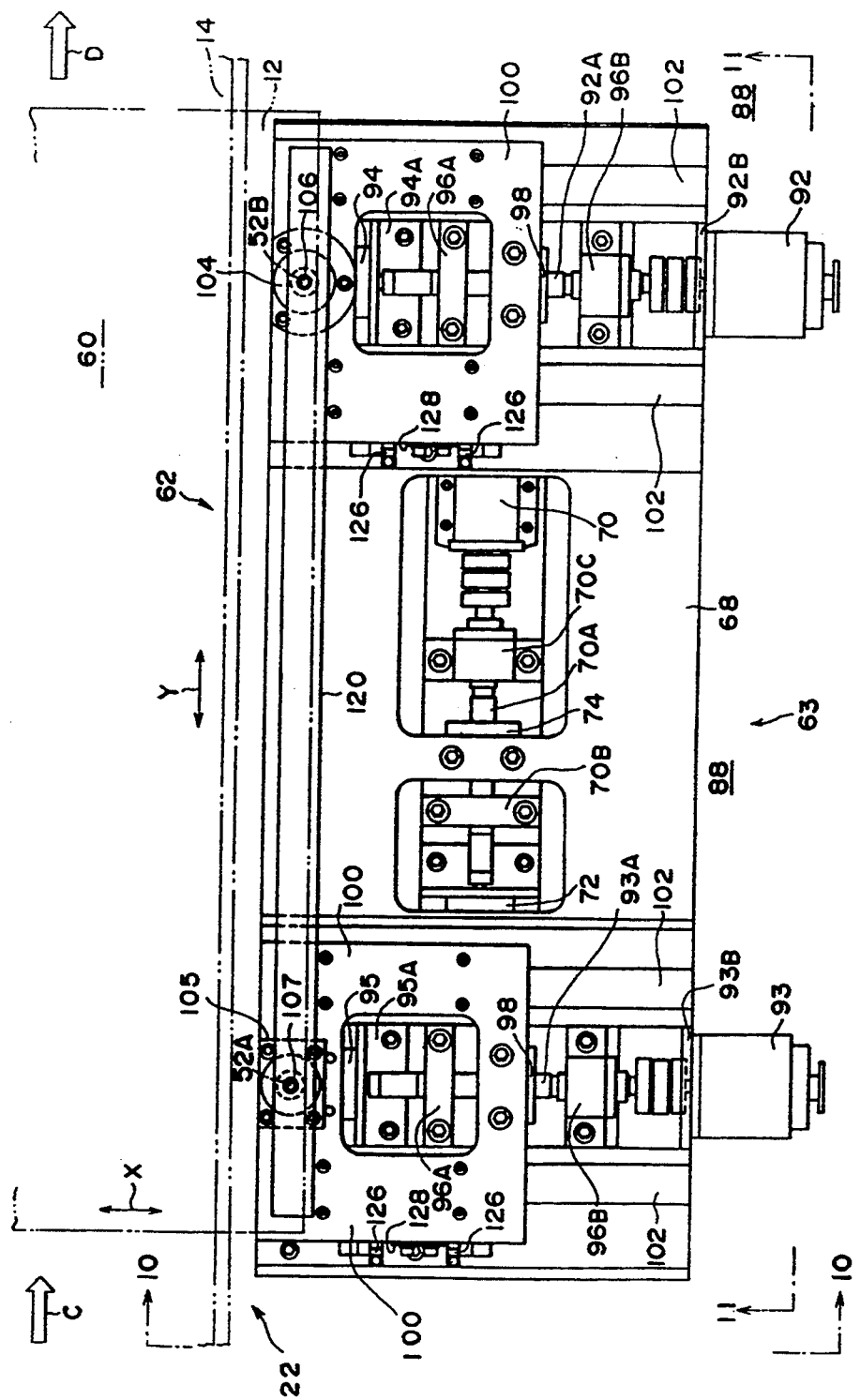
FIG. 9 is a plan view illustrating a registering device relating to the first embodiment.

The encoders 72, 94, 95, which are respectively provided at ends of the driving shafts 70A, 92A, 93A of the stepping motors 70, 92, 93, detect the amounts by which the stepping motors 70, 92, 93 are driven respectively. Further, in the present embodiment, a limiting means which limits excessive movement of the pin base 100 and the moving plate 68 is provided as a measure for protecting the apparatus. Namely, as shown in FIGS. 9 and 11, a pair of sensors 126, in which a slit is formed, and a detection plate 128, which is insertable into the slit of the pair of sensors 126, are disposed between each pin base 100 and the moving plate 68. The range of movement of the pin bases 100, which are moved by the energizing of the respective stepping motors 92, 93, is regulated by the detection plates 128 and the pairs of sensors 126. As shown in FIG. 10, the detection plates 128 and the pairs of sensors 126 are also disposed between the base plate 64 and the moving plate 68 in the same manner as above (only one side is illustrated in FIG. 10). The detection plates 128 and the pairs of sensors 126 regulate the range of movement of the moving plate 68, which is moved by the energizing of the stepping motor 70.

An unillustrated squeeze mechanism is provided in order to remove the air which remains between the PS plate 14, which is loaded on the surface plate 60, and the negative film 12, which is registered on and fixed to the top surface of the PS plate 14. The air between the PS plate 14 and the negative film 12 is removed by the squeeze mechanism such that the PS plate 14 and the negative film 12 are fit together tightly.

Next, a light source 134 will be described. The light source 134 is used to print the images of the negative film 12, which is loaded on and fit to the PS plate 14, onto the PS plate 14.

As shown in FIG. 12, the light source 134 is disposed above the surface plate 60. The light source 134 is covered by a light source hood 136. The light source hood 136 is mounted to ends of driving shafts of air cylinders 138, 140 which are supported by a frame body 11 of the plate material printing apparatus 10, The light source hood 136 hangs down from the air cylinders 138, 140, Further, ones of ends of guide bars 142, which are supported by the frame body 11, are connected to the light source hood 136. Intermediate portions of the guide bars 142 are supported so as to be slidable in vertical directions by slide bearings 144, which are supported by the frame body 11. Accordingly, the light source hood 136 is raised and lowered in vertical directions (in the directions of approaching and moving away from the surface plate 60 as shown in FIG. 12) by the driving of the air cylinders 138, 140.

Presser members 146, whose cross sections are L-shaped, are mounted to a lower end portion of the light source hood 136. Hard sponges 147 are stuck to the bottom portions of the presser members 146. When the light source hood 136 is activated, the sponges 147 push on the superposed portions of the PS plate 14, which is on the surface plate 60, and the negative film 12, which is loaded on the PS plate 14.

In this state, the light source 134 is lit. The images of the negative film 12 are printed onto the PS plate 14.

In this way, images are printed on the left side paper surface and the right side paper surface, which are shown in FIG. 8, of the PS plate 14 of a size of two newspaper pages. By printing onto the PS plate 14 twice, the lengths 14A of the spaces between the images printed on the PS plate 14 are at a photocomposition pitch.

Control Portion 58

A CPU, a ROM, a RAM and the like are provided at a control portion 58. The control portion 58 controls the operations of each processing portion of the plate material printing apparatus 10. Further, as shown in FIG. 1, an operation panel 59 is connected to the control portion 58 such that processing data and the like of the plate material printing apparatus 10 can be input to the control portion 58.

The amounts by which the stepping motors 70, 92, 93 are energized to the moving device 63 of the printing portion 22 can be input to the control portion 58 by a key operation of the operation panel 59. The pin bar 120 is moved along the directions of arrow Y in FIG. 8 by the control portion 58 energizing the stepping motor 70. The pins 106, 107 are moved in the directions of arrow X in FIG. 8 by the control portion 58 energizing the stepping motors 92, 93. Further, by changing the amount of movement generated by the stepping motors 92, 93, the pins 106, 107 move relatively in a direction of rotation on a plane along the upper surface of the surface plate 60 such that the pins 106, 107 are spaced apart evenly. The encoders 72, 94, 95 are reset in order to return the stepping motors 70, 82, 93 to their initial positions.

Next, the operation of the embodiment will be described.

First, the printing of the images, which are recorded on the negative film 12, onto the PS plate 14 by the plate material printing apparatus 10 will be described.

The negative film 12, on which images are recorded, is accommodated in the tray. 32 of the stock portion 16 of the plate material printing apparatus 10. The plate material printing apparatus 10 is operated.

The negative film 12 is loaded on the surface plate 44 of the punching portion 18, and is sucked and fixed thereto by negative pressure being supplied to the grooves 46. Thereafter, the image areas of the negative film 12 are detected. The punch holes 52A, 52B are formed by the punchers 50 of the punch portion 48 at positions corresponding to the image areas of the negative film 12.

The negative film 12, in which the punch holes 52A, 52B are formed, is conveyed to the negative film supplying portion 20, and is then transported to the printing portion 22.

In the printing portion 22, the PS plate 14 is positioned at a predetermined position on the surface plate 60. The pins 107, 106 are inserted into the punch holes 52A, 52B of the negative film 12 such that the negative film 12 is maintained by the pin bar 120. In this way, the image portions of the negative film 12 can be registered at predetermined positions of the PS plate 14.

After the negative film 12 is registered at the predetermined position of the PS plate 14, squeezing is carried out. The images of the negative film 12 are printed onto the PS plate 14. The PS plate 14 and the negative film 12 are discharged from the printing portion 22. Thereafter, when the next negative film 12 is supplied to the printing portion 22 and the images are printed, the operation is repeated in the same way. At this time, when printing processing is being effected in the printing portion 22, reference positions for the subsequent negative film 12 are set at the punching portion 18, and the negative film 12 is supplied to the printing portion 22.

In the printing portion 22, the image portions of the negative film 12 are positioned in advance by the pins 106, 107 so as to correspond to the PS plate 14 fixed on the surface plate 60. Therefore, there is no need to register the negative film 12 to the PS plate 14. Printing processing can thereby be effected quickly.

Next, adjustment of differences between plate material printing apparatuses 10 will be described.

First, the images of the negative film 12 are printed onto the PS plate 14. A comparison of images printed onto the PS plate 14 by the plate material printing apparatus 10 and images from the same negative film 12 printed onto the PS plate 14 by other plate material printing apparatuses shows displacement of images, i.e., differences between plate material printing apparatuses. Next, the displacement in each direction of the images is input by key operation of the operation panel 59. Accordingly, the control panel 58 energizes the stepping motors 70, 92, 93 of the moving device 63 so that the maintaining portion 62 is moved to the position which was key-input.

The movement of the maintaining portion 62 in the direction of arrow Y is effected by the stepping motor 70 of the moving device 63. The pins 106, 107 are moved in the direction of arrow X by the respective stepping motors 92, 93. Further, by changing the amounts by which the stepping motors 92, 93 are energized, the pins 106, 107 are moved relatively. Accordingly, movement of the pins 106, 107 in directions of rotation of the negative film 12 on the PS plate 14 is possible.

The images of the negative film 12 can be disposed at arbitrary positions on the PS plate 14 by the operation of the moving device 63. Further, the differences between the plate material printing apparatus 10 and other plate material printing apparatuses can be substantially eliminated. In this way, there is no color displacement in the finished color images even if the negative films 12, upon which a plurality of color separated images obtained from one color image are recorded, are subjected to printing processing in parallel by using the plate material printing apparatus 10 and other plate material printing apparatuses.

It is possible to set the photocomposition pitch 14A at the plate material printing apparatus 10. When the PS plate 14 is moved on the surface plate 60 without moving the maintaining portion 62, the images are printed at a constant photocomposition pitch 14A.

After printing onto the right side surface of the PS plate 14, shown in FIG. 8, has been completed, the PS plate 14 is moved. The stepping motor 70 is energized, and the pin bar 120 moves in the direction of arrow Y. Accordingly, the photocomposition pitch 14A of the PS plate 14 can be changed. The maintaining portion 62 of the plate material printing apparatus 10 can be moved by input from the operation panel 59. Therefore, if the movement of the maintaining portion 62 is set in advance as the photocomposition pitch 14A, the stepping motor 70 can be energized in correspondence with the photocomposition pitch 14A.

The photocomposition pitch 14h of the PS plate 14 often varies according to the user of the plate material printing apparatus 10. In the plate material printing apparatus 10 related to the present invention, the movement of the maintaining portion 62 can be input from an outside source. Therefore, the photocomposition pitch which the user desires can be easily set.

In the present embodiment, the punching portion 18 is provided at the plate material printing apparatus 10 so as to form the punch holes 52A, 52B, which are used as reference positions, in the negative film 12. However, the punch holes 52A, 52B may be formed in advance in the negative film 12 loaded in the plate material printing apparatus 10. In this case, it suffices to form the punch holes 52A, 52B at positions which are determined in advance with respect to the images.

Further, the punch holes 52A, 52B provided in the negative film 12 are used as reference positions. However, the present embodiment is not limited to the same. It suffices to set one of the corners of the negative film 12 and a side adjacent to the corner as the reference positions. Namely, it suffices that the images are recorded on the negative film 12 with the above-mentioned corner and one side adjacent thereto as references. At the printing portion 22, the corner and the one side adjacent thereto are taken as references, and a maintaining means holds the negative film in accordance with these references.

Further, in the present embodiment, the pin bar 120 is moved by the input from the operation panel 59. However, a construction may be provided in which the pin bar 120 is moved such that the positions of the images of the negative film 12, which are read by the sensors 54A, 54B, 54C of the punching portion 18 or the like, are placed at predetermined positions of the PS plate 14 positioned on the surface plate 60 of the printing portion 22.

In the present embodiment, the pin bar 120 is moved in the Y directions by the stepping motor 70. The pin bar 120 is moved in the X directions and in directions of relative rotation by the stepping motors 92, 93. However, the directions of movement generated by each of the stepping motors are not limited as long as movement in the X directions, the Y directions and directions of relative rotation is possible. For example, it suffices that two stepping motors are used for movement in the X directions and the Y directions and the pin bar 120 is rotated by the remaining one stepping motor.

Second Embodiment

Next, a second embodiment of the present invention will be described. The basic structure of the apparatus in the second embodiment is the same as that of the first embodiment. The same parts are denoted by the same reference symbols, and description thereof is omitted.

Main portions of a plate material printing apparatus 150 relating to the second embodiment are illustrated in FIGS. 13 through 22.

In place of the punching portion 18 of the plate material printing apparatus 10, a punch hole forming portion 200, which forms punch holes used for positioning, is provided at the plate material printing apparatus 150. Further, a transport device 151, which is used as a transporting means to transport the negative film 12 from the stock portion 16 onto a surface plate 202 of the punch hole forming portion 200, is disposed at the plate material printing apparatus 150. The transport device 151 and the punch hole forming portion 200 will be described hereinafter.

Figure 13:
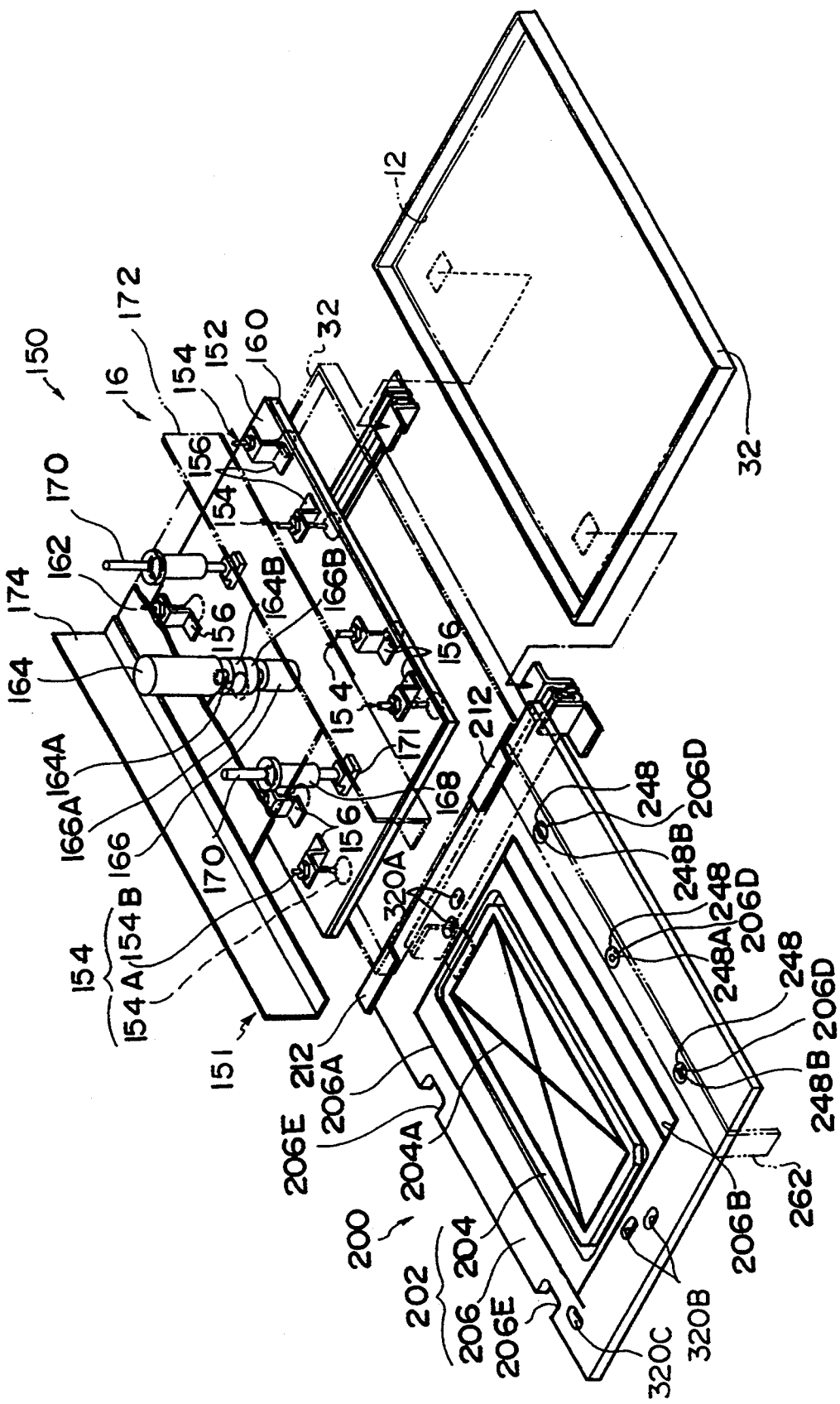
FIG. 13 is a perspective view illustrating a transport device relating to a second embodiment.
Figure 14:
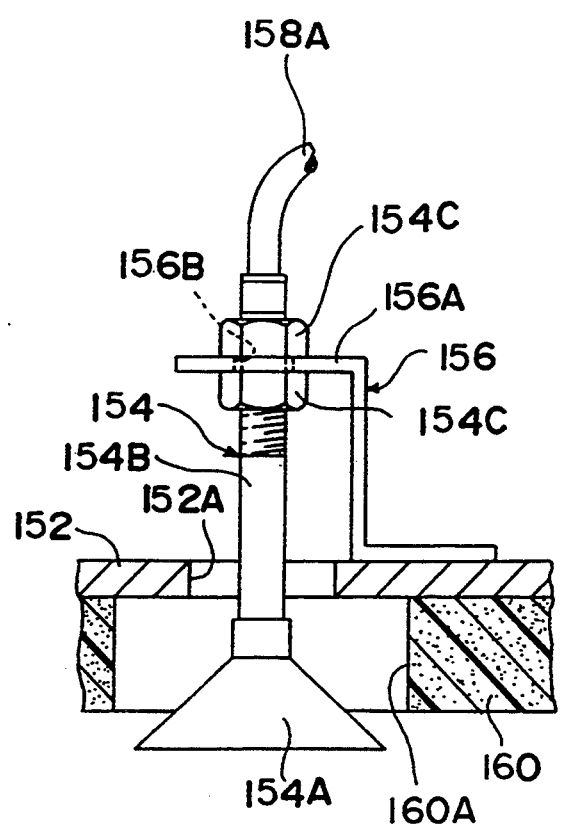
FIG. 14 is an enlarged view of main portions illustrating a vicinity of a suction cup of the transport device relating to the second embodiment.

As shown in FIG. 13, when the tray 32 of the stock portion 16 is loaded, a suction cup supporting board 152 of the transport device 151 is positioned above the tray 32. As an example, eight suction cups 154 are provided at the suction cup supporting board 152. As illustrated in FIG. 14, circular holes 152A are provided in the suction cup supporting board 152 at positions at which the suction cups 154 are mounted. Base sections 154B of the suction cups 154 respectively penetrate the circular holes 152A. The base section 154B, which sucks air from a suction portion 154A of the suction cup 154, penetrates through a hole 156B provided in a top plate section 156A of a crank-shaped bracket 156. A male screw is formed in the base section 154B of the suction cup 154 such that a pair of nuts 154C are screwed therewith. The pair of nuts 154C are fastened such that the top plate portion 156A is interposed therebetween. Piping 158A from an unillustrated ejector is connected to the top end of the base portion 154B of the suction cup 154.

The lower end portion of the bracket 156 is fixed to the upper surface of the suction cup supporting board 152. In this way, the suction cup 154 is supported such that the suction portion 154A protrudes slightly from the bottom surface of the suction cup supporting board 152.

As shown in FIGS. 13 through 16, a soft sheet 160 is attached to the bottom surface of the suction cup supporting board 152. Circular holes 160A (shown in FIG. 14) are provided in the soft sheet 160 at positions corresponding to the suction portions 154A of the suction cups 154. The soft sheet 150 is sponge-like. When the suction cup supporting board 152 is moved to the punch hole forming portion 200 and is lowered, the negative film 12 is interposed between the soft sheet 160 and the top surface of the surface plate 202.

Figure 15:
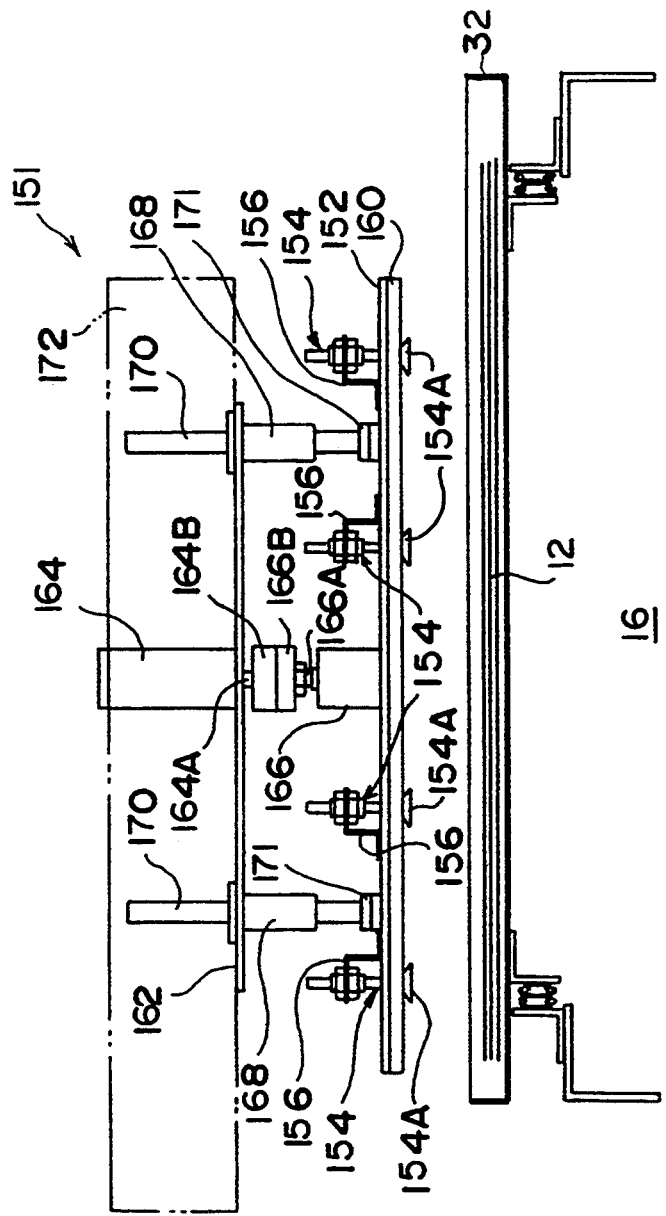
FIG. 15 is a front view of main portions illustrating a vicinity of a stock portion relating to the second embodiment.

As shown in FIGS. 13 and 15, a moving plate 162 is disposed above and parallel to the suction cup supporting board 152. A cylinder 164 is mounted at a central portion of the moving plate 162. A rod 164A penetrates downward (in the direction of the suction cup supporting board 152) through the cylinder 164. A disc-shaped flange 164B, whose diameter is larger than that of the rod 164A, is fixed to an end of the rod 164A.

A cylinder 165 is mounted coaxially to the cylinder 164 at a central portion of an upper surface of the suction cup supporting board 152. A rod 166A extends upward (in the direction of the moving plate 162) from the cylinder 166.

A flange 166B, which is the same shape as the flange 164B, is fixed to an end portion of the rod 166A. The flange 155B is fixed to the flange 164B. Accordingly, the suction cup supporting board 152 is held by the moving plate 162 so as to hang down by the cylinders 164, 156.

The suction cup supporting board 152 can be raised and lowered greatly by the extension and retraction of the rod 164A of the cylinder 164 on the moving plate 162 side. The suction cup supporting board 152 can be raised and lowered slightly by the extension and retraction of the rod 166A of the cylinder 166. Namely, when the topmost negative film 12 is sucked from the tray 32, the suction cup supporting board 152 is raised and lowered by the driving of the cylinder 164. When the sucked negative film 12 is placed on the surface plate 202 of the punch hole forming section 200, the suction cup supporting board 152 is raised and lowered by the driving of the cylinder 166. By the control of the control portion 58, the appropriate amounts of movement are achieved by maximum strokes of the respective cylinders 164, 166.

Figure 16:
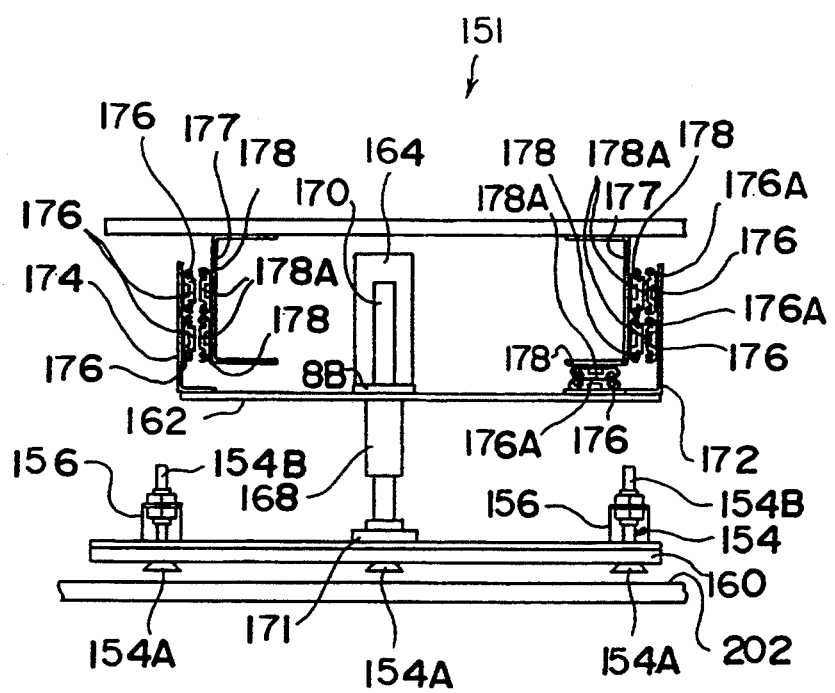
FIG. 16 is a side view of main portions of the transport device relating to the second embodiment.

As shown in FIGS. 13, 15, and 16, slide bearings 168 are mounted to the bottom surface of the moving plate 162 such that the cylinder 164 is located between the slide bearings 168. Shafts 170 respectively penetrate through the slide bearings 168 so as to beslidable in the axial direction. Ones of ends of the shafts 170 are connected to the suction cup supporting board 152. When the suction cup supporting board 152 is raised and lowered by the driving of the cylinders 164, 166, the shafts 170 guide the suction cup supporting board 152 so that it is in a horizontal state, and prevent rotation of the suction cup supporting board 152.

As shown in FIGS. 13 and 16, brackets 172, 174, which are bent into L-shapes, are mounted to the moving plate 162. A guide rail 176 is respectively mounted to the horizontal surfaces of the brackets 172 and to the side walls of the brackets 172, 174, Sliders 176A of the guide rails 176 are fixed respectively to sliders 178A of guide rails 178 which are mounted to an apparatus frame above the surface plate 202 of the punch hole forming section 200 via substantially U-shaped brackets 177. Namely, the sliders 176A and the sliders 178A are formed so as to move integrally. When the guide rails 176, 178 are superposed so as to oppose each other, the moving plate 162 is positioned above the surface plate 202. When the guide rails 176 slide with respect to the guide rails 178 in the direction of the stock portion 16 via the sliders 176A and the sliders 178A, the moving plate 162 is positioned above the tray 32.

This movement is effected, for example, by the driving of an unillustrated rodless cylinder which spans between the stock portion 16 and punch hole forming portion 200.

Figure 17:
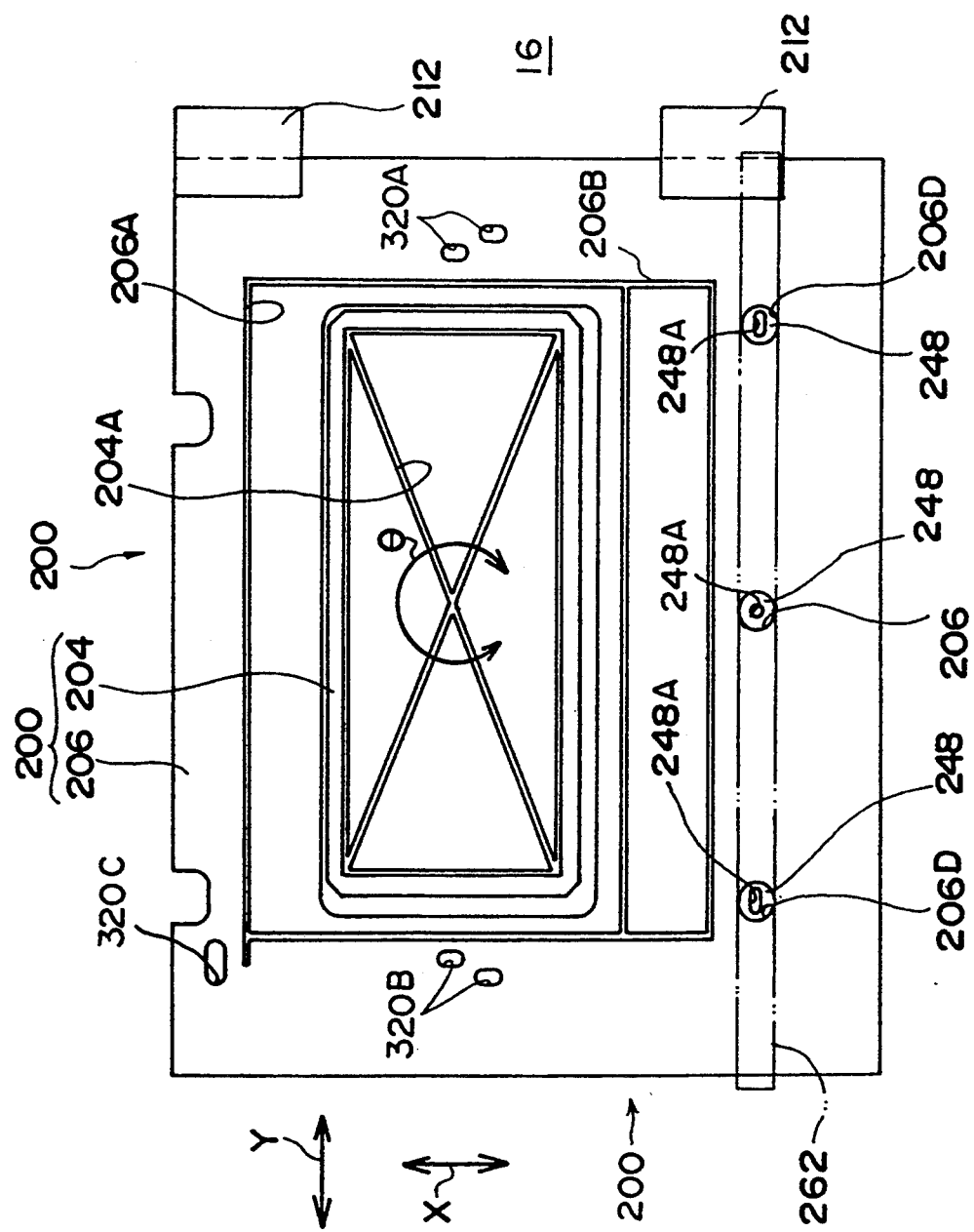
FIG. 17 is a plan view illustrating a surface plate relating to the second embodiment.
Figure 22:
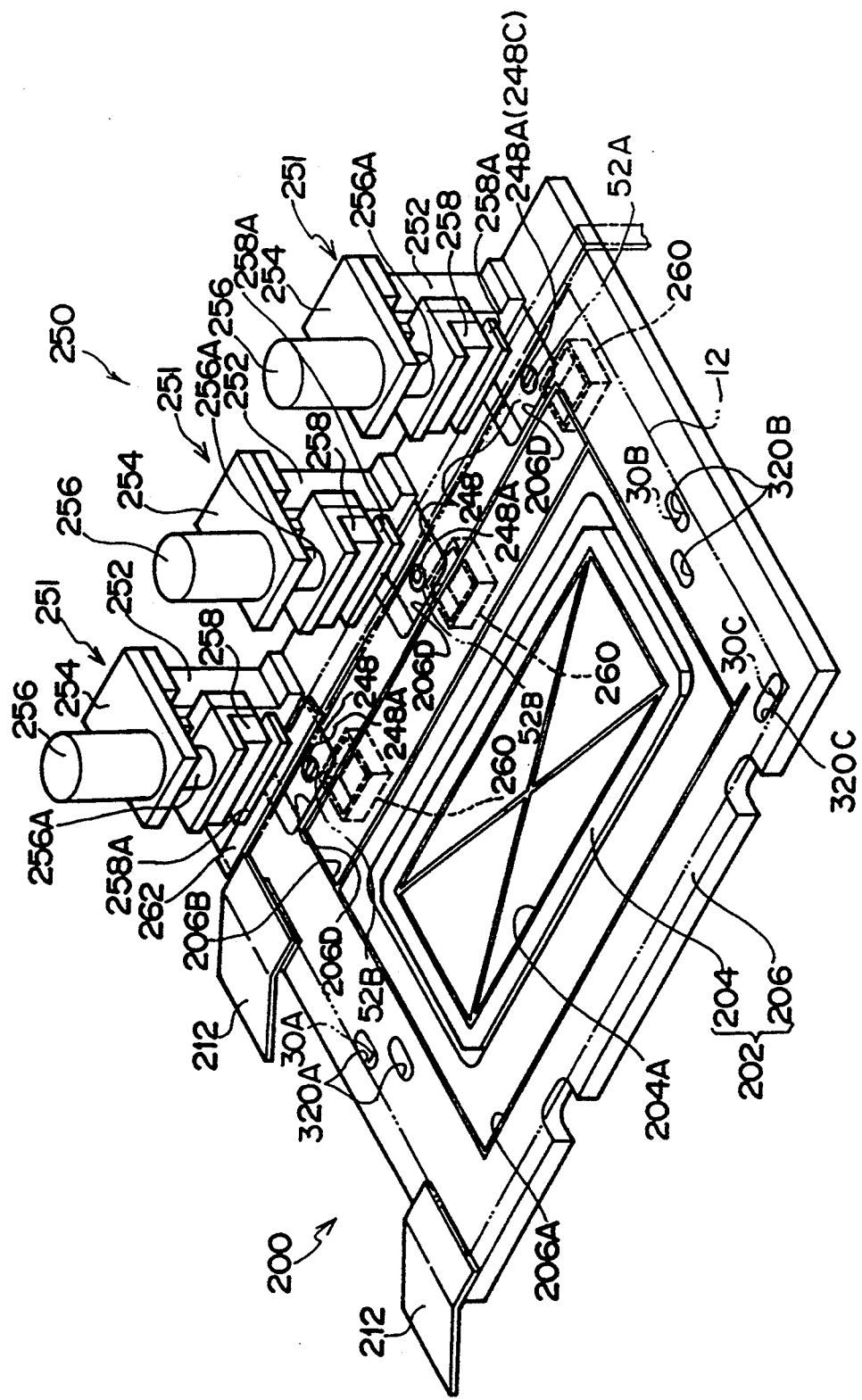
FIG. 22 is a perspective view of main portions illustrating a punch hole forming portion relating to the second embodiment.

As shown in FIGS. 17 and 22, the punch hole forming portion 200 is equipped with a surface plate 202 which is divided into a moving surface plate 204, which is adjacent to the tray 32 and is a movable portion, and a fixed surface plate 206, which is a fixed portion. A central portion of the fixed surface plate 206 is formed with a substantially rectangular opening. The moving surface plate 204, which is substantially rectangular, is disposed in the opening of the fixed surface plate 206.

Grooves 204A are formed in the moving surface plate 204 along the peripheral portions and as diagonal lines. Portions of the base portion of the grooves 204h communicate with the bottom surface of the moving surface plate 204. A suction pipe 208A (see FIG. 18), which is connected from an unillustrated ejector by piping, is connected to these communicating portions. When the negative film 12 is on the moving surface plate 204, air is sucked by the suction pipe 208A such that the negative film 12 is sucked to and held at the moving surface plate 204.

A groove 206A is formed in the fixed surface plate 206 around the moving surface plate 204. A substantially U-shaped groove 206B is formed so as to be connected to the groove 206A on the device side of the groove 206A. The grooves 206A, 206B communicate with a negative pressure supplying means by an unillustrated ejector or the like. When the negative film 12 is on the fixed surface plate 206, the negative film 12 is sucked to and held at the fixed surface plate 206 by air being sucked by a suction pipe 210A.

As shown in FIG. 13, the height of the surface plate 202 is set to be higher than the height of the tray 32. As a result, the negative film 12, which is sucked by the suction cup supporting board 152, is brought up to a position higher than the surface plate 202 and is moved horizontally. However, due to slackness of the negative film 12, the front end portion in the direction of transport (the horizontal direction) may abut a corner portion of the surface plate 202 so that the negative film 12 is not transported smoothly. Therefore, in the present embodiment, guide plates 212 having angled surfaces are disposed at an end portion of the fixed surface plate 206 at the tray 32 side so as to correspond to both ends of the negative film 12 in the transverse direction thereof.

The negative film 12, which is moved onto the surface plate 202 by the suction cup supporting board 152, is slightly lowered by the driving of the cylinder 166, and the suction is cancelled. At this time, the negative film 12 is placed so as to extend over the fixed surface plate 206 and the moving surface plate 204. In this state, negative pressure is supplied to the grooves 204A of the moving surface plate 204 such that the negative film 12 is sucked to and held at the moving surface plate 204.

Figure 18:
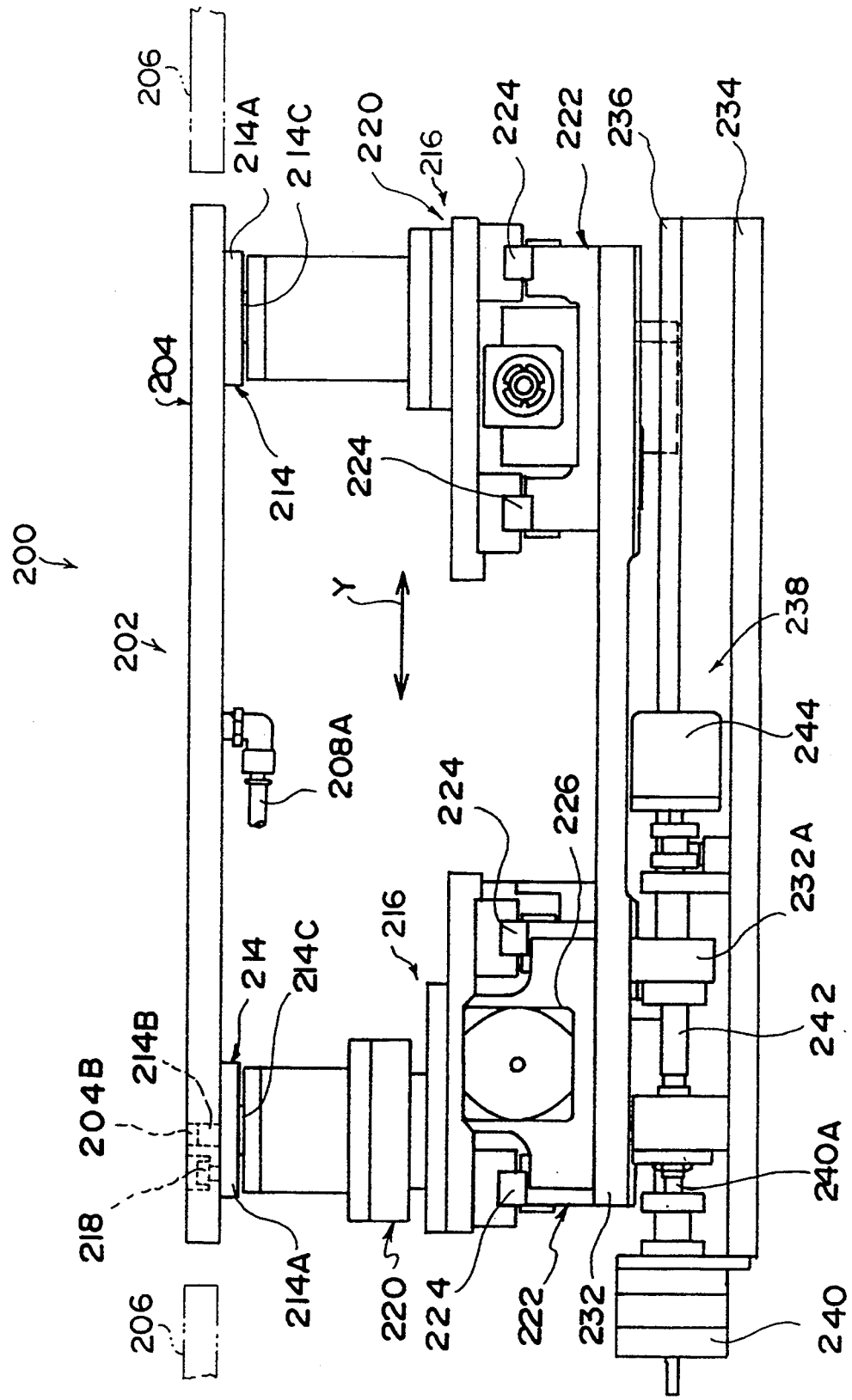
FIG. 18 is a front view of main portions illustrating a moving surface plate.
Figure 19:
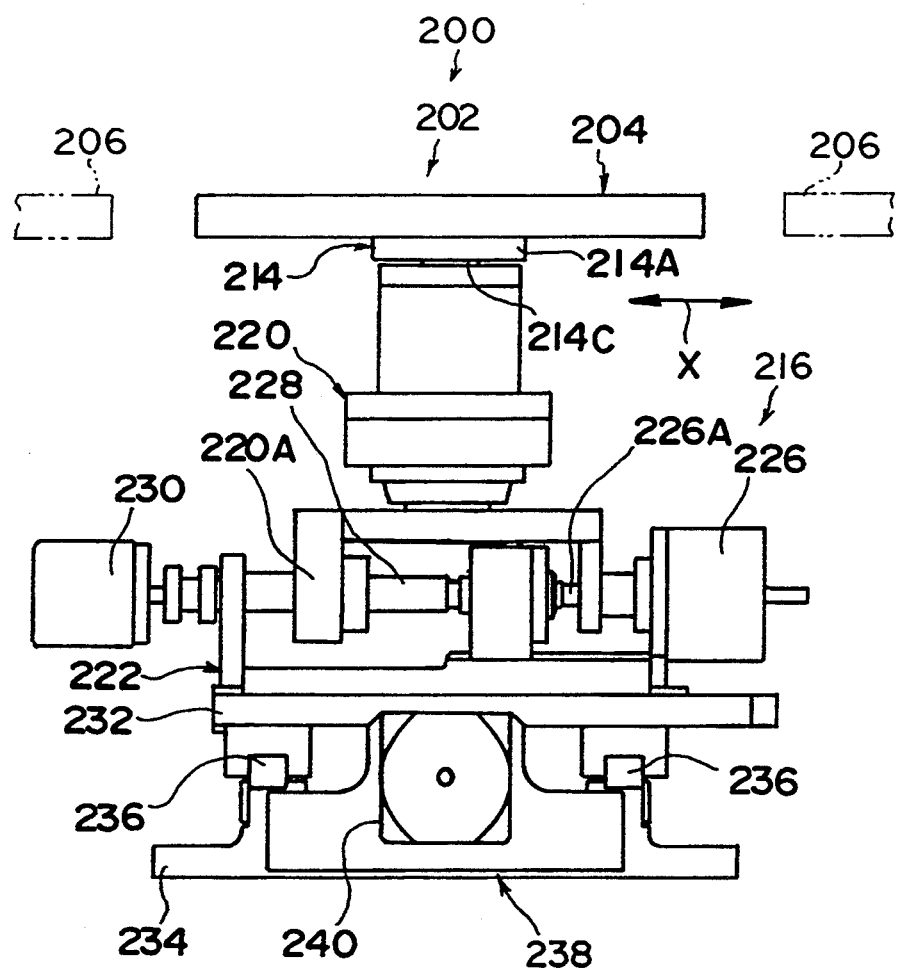
FIG. 19 is a side view of main portions illustrating the moving surface plate.
Figure 20:
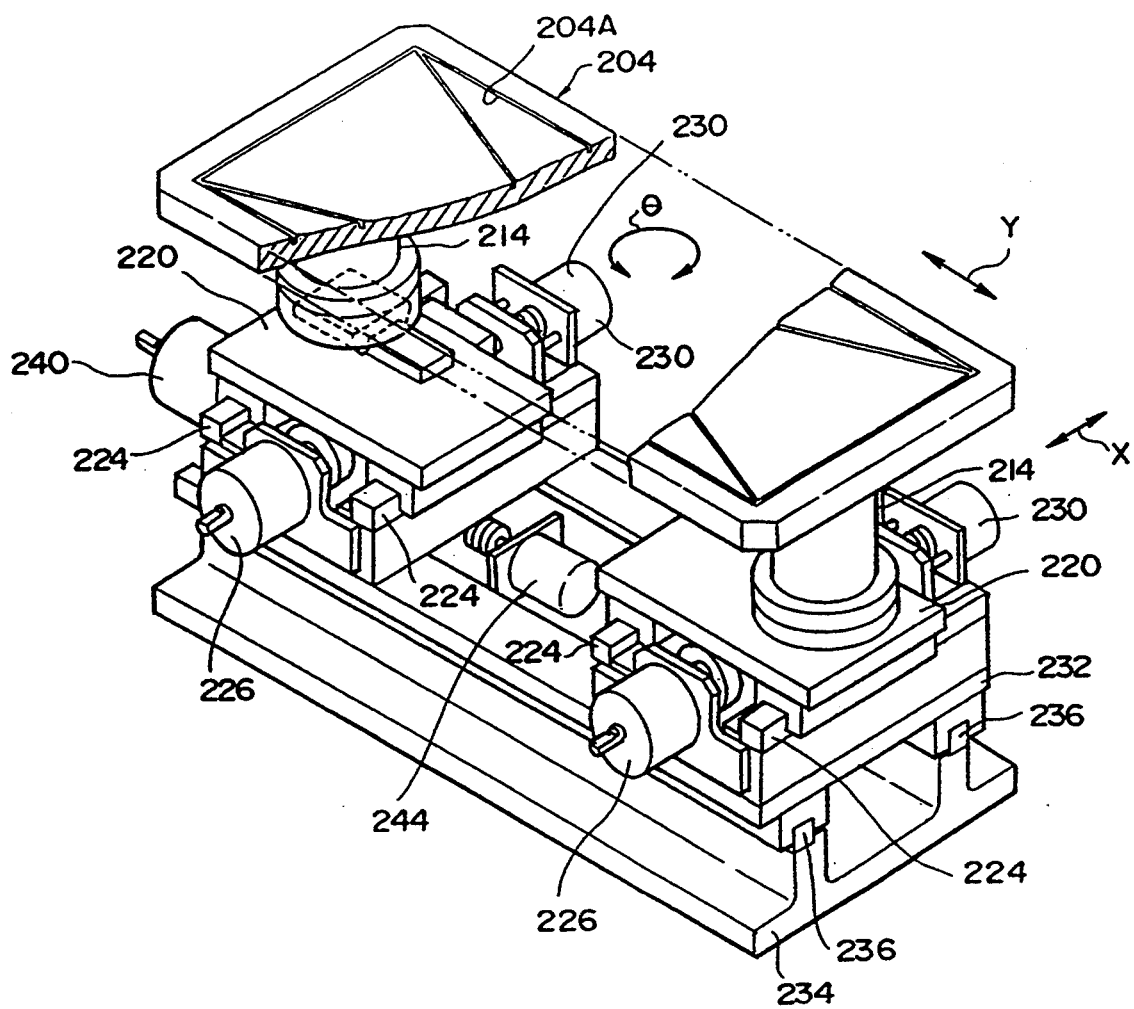
FIG. 20 is a perspective view illustrating the moving surface plate.

As shown in FIGS. 18 through 20, the moving surface plate 204 is supported by a pair of supporting blocks 214 provided in substantially central portions in the transverse direction (the direction of the shorter side) of the moving surface plate 204. The supporting block 214 forms a portion of an X directions moving mechanism portion 216 which moves the moving surface plate 204 in the transverse directions (hereinafter, the "X directions").

The supporting block 214 is columnar. A large diameter collar portion 214A is formed at an intermediate portion in the axial direction of the supporting block 214. A small diameter shaft portion 214B, which protrudes further toward the moving surface plate 204 side than the large diameter collar portion 214A, is inserted into a circular hole 204B formed in the moving surface plate 204. The large diameter collar portion 214A is fixed to the moving surface plate 204 at an area around the circular hole 204B by bolts 218. A shaft portion 214C, which protrudes further downward than the large diameter collar portion 214A of the supporting block 214, is axially supported by a first moving base 220.

The first moving base 220 is supported by a pair of rails 224 which are provided along the X directions of the moving surface plate 204 at a sub-base 222. In this way, the first moving base 220 can move along the rails 224.

A stepping motor 226 is mounted to the sub-base 222. As shown in FIG. 19, a driving shaft 226A of the stepping motor 226 is parallel to the rails 224, i.e., the driving shaft 226A runs along the X directions of the moving surface plate 204. A shaft 228, in which a male screw is formed, is fixed coaxially to the driving shaft 226A. A female screw of a moving block 220A, which is secured to the bottom surface of the first moving base 220, is screwed with the male screw of the shaft 228.

As a result, when the shaft 226 is rotated by the energizing of the stepping motor 226, the first moving base 220 is guided by the rails 224 and is moved in the axial direction of the shaft 228 by a ball screw mechanism. Before being energized, the stepping motor 226 is set at its regular, established, initial position by a rotary encoder 230. The first moving base 220 can be moved precisely by the energizing of the stepping motor 226 in accordance with an amount calculated by an unillustrated control device.

One of the supporting blocks 214 of the pair of the X directions moving mechanism portions 216 can rotate and can move in directions orthogonal to the axis with respect to the first moving base 220. The other supporting block 214 can rotatingly move with respect to the first moving base 220. As a result, by only the other X directions moving mechanism portion 216 moving, the moving surface plate 204 can rotate with the one X directions moving mechanism portion 216 as the center of rotation (movement in the directions of θ shown in FIG. 20). In this case, the variation in the pitch dimension between the pair of supporting blocks 214 is absorbed by the movement of the supporting block 214 of the one X directions moving mechanism portion 216 in directions orthogonal to the axis.

As shown in FIG. 20, the pair of X directions moving mechanism portions 216 is supported by a second moving base 232. The second moving base 232 is supported by a pair of rails 236 provided at a main base 234. The rails 236 are provided parallel to each other along the longitudinal direction (hereinafter "the Y directions") of the moving surface plate 204. In this way, the second moving base 232 can move in the Y directions with respect to the main base 234. The second moving base 232 and the main base 234 form a portion of a Y directions moving mechanism portion 238.

As illustrated in FIG. 18, a stepping motor 240 is mounted to the main base 234. A driving shaft 240A of the stepping motor 240 is parallel to the rails 236, i.e., is parallel to the Y directions of the moving surface plate 204. A shaft 242, in which a male screw is formed, is secured coaxially to the driving shaft 240A. A female screw of a moving block 232A, which is secured to the bottom surface of the second moving base 232, is screwed with the male screw of the shaft 242.

As a result, when the shaft 242 is rotated by the energizing of the stepping motor 240, the second moving base 232 is guided by the rails 236 and is moved in the axial direction of the shaft 242 by a ball screw mechanism. Further, a rotary encoder 244 is mounted to an end portion of the shaft 242. The rotary encoder 244 detects the number of revolutions of the shaft 242. Based on the number of revolutions of the shaft 242, the amount of movement of the second moving base 232 can be determined by calculation by an unillustrated control device.

In this way, the moving surface plate 204 can move in the X directions, the Y directions and the θ directions such that the position of the negative film 12 can be adjusted. In this case, adjustment of the position is effected with the negative film 12 being sucked only on the moving surface plate 204 and not on the fixed surface plate 206. The position of the negative film 12 is adjusted based on the register marks 30A, 30B, 30C which indicate the positions of the images recorded on the negative film 12.

Figure 21:
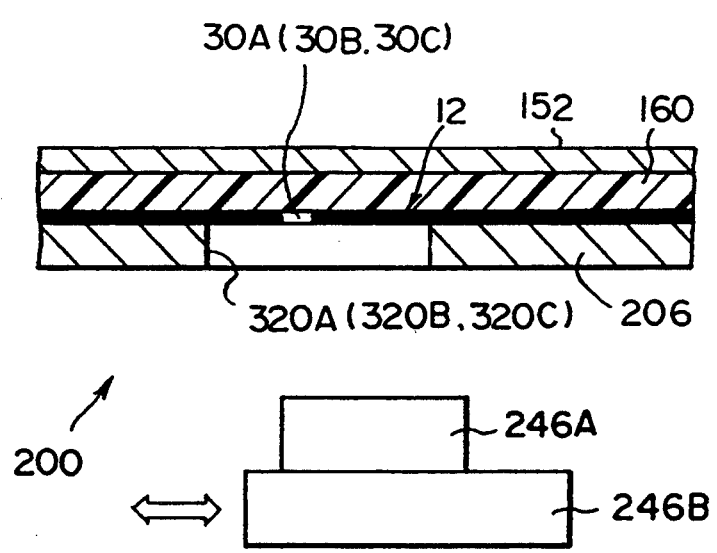
FIG. 21 is a cross-sectional view of main portions illustrating a vicinity of an elongated hole of a fixed surface plate.

As shown in FIG. 17, elongated holes 320A, 320B, 320C are provided in the fixed surface plate 206 so as to correspond to the positions at which the register marks 30A, 30B, 30C recorded on the negative film 12 are disposed. As shown in FIG. 21, a scanner 246, which is a detection means, is provided beneath each of the elongated holes 320A, 320B, 320C. In the scanner 246, a reflection sensor 246A, which has a light-emitting portion and a light-receiving portion, is fixed to a moving stand 246B so that the scanner 246 can move in the directions of the arrow. The positions of the register marks 30A, 30B, 30C are calculated based on the distances of movement from the reference positions of each of the scanners 246 to the detected positions of the register marks 30A, 30B, 30C. The moving surface plate 206 is moved, and the negative film 12 is disposed such that each of the register marks 30A, 30B, 30C is at its normal position. The punch holes 52A, 52B, 52C are formed. As shown in FIG. 22, the punch hole 52C is provided between the punch holes 52A, 52B. In the second embodiment, three punch holes are formed in the negative film 12.

When the register marks 30A, 30B, 30C are read, the suction cup supporting board 152 is lowered by the driving of the cylinder 156. The negative film 12 is sandwiched between the soft sheet 160 and the surface plate 202 so as to prevent mistakes in detection due to floating of the negative film 12.

The control portion 58 calculates the energizing pulse of each of the stepping motors 226, 240 of the moving surface plate 204 based on the amounts of displacement detected by the scanners 246. Signals are supplied to the stepping motors 226, 240, and the moving surface plate 204 is moved. The moving surface plate 204 is disposed such that the negative film 12 is positioned at the appropriate position.

When positioning of the negative film 12 has been completed, the negative film 12 is sucked by the grooves 206A, 206B of the fixed surface plate 206. The suction cup supporting board 152 is lowered by the driving of the cylinder 166 such that substantially the entire surface of the negative film 12 is interposed between the soft sheet 160 and the surface plate 202. In this way, the negative film 12 is uniformly spread out on the surface plate 202. In this state, the punch holes 52A, 52B, 52C are formed in the negative film 12.

As shown in FIG. 22, three cut-out portions 206D are provided in a side of the periphery of the U-shaped groove 206B of the fixed surface plate 206. The cut-out portions 206D are provided at predetermined intervals along the left-to-right direction as seen from the front of the apparatus.

Female puncher blocks 248, which are equipped with female punchers 248A used for forming punch holes, are inserted and mounted in the cut-out portions 206D. In the present embodiment, the female punchers 248A are arranged in two ways: the female punchers 248A in the center form circular holes 248B, and female punchers 248A on both side portions form elongated holes 248C. The kind and the number of female puncher blocks 248 are not limited to those in this example.

The female puncher block 248 forms a portion of a puncher unit 251 of a punch hole forming mechanism portion 250. In the puncher unit 251, a top plate 254 is mounted to a top end of a support 252. The top plate 254 extends further towards the rear side of the apparatus than the support 252. A cylinder 256 is mounted to the top surface of the extended portion. The axis of a rod 256A of the cylinder 256 is the same as the axis of the female puncher 248A of the female puncher block 248.

A male puncher block 258 is mounted to the end of the rod 256A. There are two types of puncher types which correspond respectively to the two types of female puncher blocks 248. As a result, when the rod 256A is extended by the driving of the cylinder 256, the male puncher (omitted from the drawings) and the female puncher 248A mesh. The punch holes 52A, 52B, 52C are formed in the negative film 12 loaded on the surface plate 202 (the fixed surface plate 206). A presser plate 258A is provided beneath the male puncher block 258 so as to press down the periphery of the position at which the negative film 12 is punched.

Beneath each of the female puncher blocks 248, a punchings receptacle 260 is disposed so as to be detachable. The punched-out portions of the negative film 12 are collected in these punchings receptacles 260.

Further, a guide plate 262 is movably disposed above the female puncher blocks 248. The guide plate 262 is disposed so as to span longitudinally across the upper surface of the fixed surface plate 206 above the female puncher guide blocks 248. Both end portions of the guide plate 262 are bent downward substantially orthogonally along the side surfaces of the fixed surface plate 206. The ends of the guide plate 262 are connected by an unillustrated supporting plate which is disposed beneath the fixed surface plate 206. A driving shaft of an unillustrated cylinder, for example, is connected to the supporting plate. By the driving of the cylinder, the guide plate 262 moves between a covering position above the female punchers 248A and a withdrawn position at an end portion of the fixed surface plate 206.

At the covering position of the guide plate 262, when the negative film 12 is transported from the tray 32 side, the female punchers 248A are covered so that the negative film 12 will not get caught thereat.

Further, in the second embodiment, the three punch holes 52A, 52B, 52C are formed in the negative film 12. As a result, pins (omitted from the drawings), which correspond respectively in configuration and position to the punch holes 52A, 52B, 52C, are provided on the pin bar 120 of the printing portion 22.

Next, the operation of the punch hole forming portion 200, which forms punch holes used for positioning and which is applied to the second embodiment, will be described in accordance with the flowcharts in FIGS. 23A and 23B. These flowcharts illustrate a portion of the operation of the plate material printing apparatus 150. Before processing in the punch hole forming portion 200, the moving surface plate 204 is disposed at its original position (at the initial position of the ball screw mechanism which was described above) by the rotary encoders 230, 244. At the original position, the moving surface plate 204 is shifted toward an end of an opening of the fixed surface plate 206. The stepping motors 226,240 rotate correctly, and the moving surface plate 204 is moved from the original position.

Figure 23A:
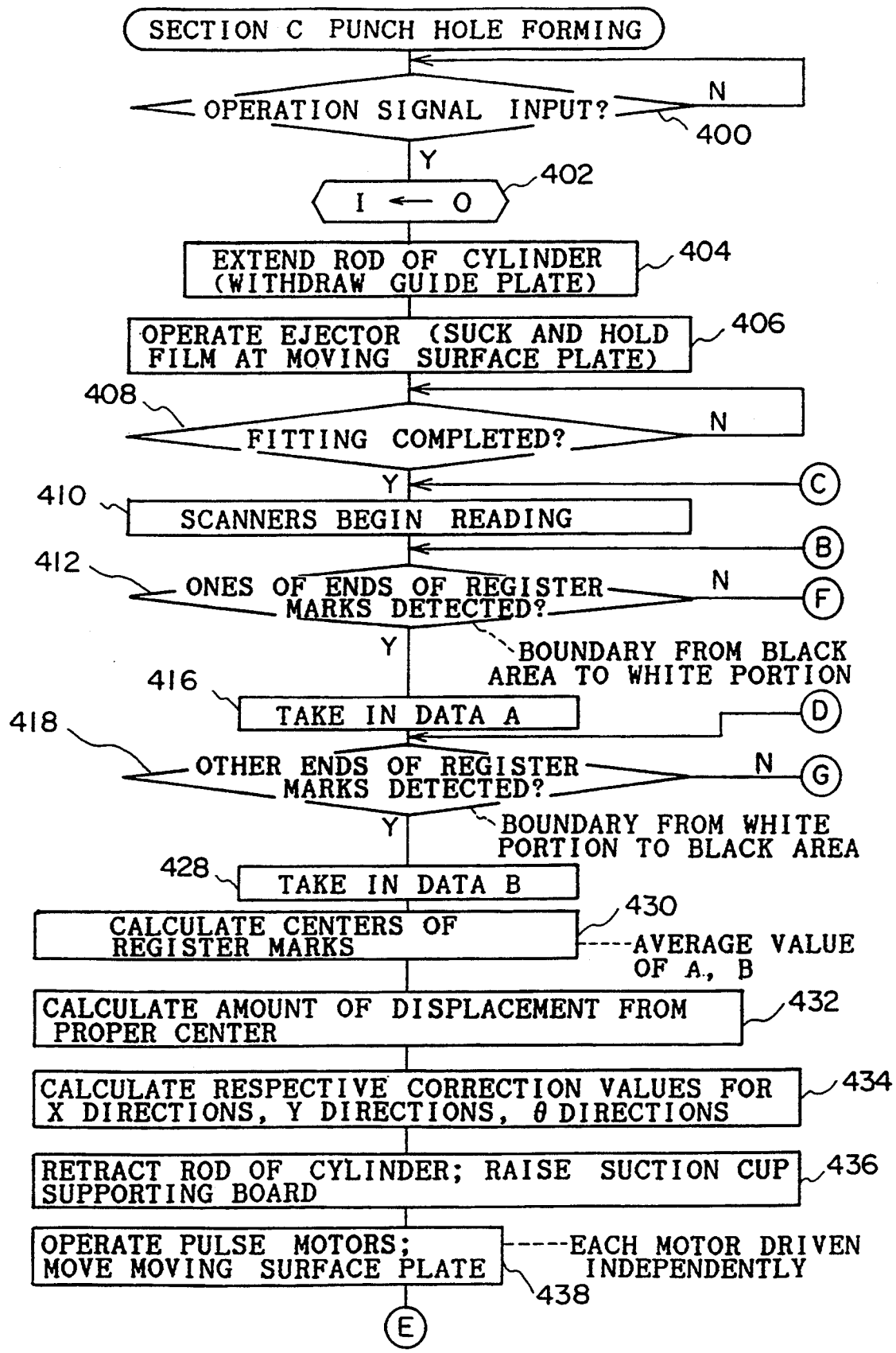

As shown by the flowchart in FIG. 23A, when the input of an operation signal is verified in step 400, the process moves on to step 402 where a variable I is reset to zero. In step 404, the guide plate 262 withdraws from above the female punchers 248A of the female puncher blocks 248.

In subsequent step 406, negative pressure is supplied to the grooves 204A, and the negative film 12 is sucked to and held at the moving surface plate 204. In this way, the negative film 12 moves integrally with the moving surface plate 204 and can move relatively with respect to the fixed surface plate 206.

When a determination is made in the next step 408 that the fitting of the negative film 12 to the moving surface plate 204 has been completed, the process moves to step 410. In step 410, the scanners 246 begin to read the register marks 30A, 30B, 30C recorded on the negative film 12. At this time, the suction cup supporting board 152 is in a lowered state. Even if there is curling, folding, bending or the like in the negative film 12, the negative film 12 is pressed down and fit to the surface plate 202 by the soft sheet 160. Therefore, the register marks 30A, 30B, 30C can be accurately read without any errors in detection due to floating of the negative film 12.

In step 412, a determination is made as to whether or not ones of ends of the register marks 30A, 30B, 30C, i.e., the boundary from a black area to a white area of the negative film 12, have been detected. If the answer to the determination in step 412 is "No", the process moves onto step 414 where a determination is made as to whether the reading areas were overshot by the scanners 246. If the answer to the determination in step 414 is "No", the process moves to step 412. Steps 412,414 are repeated until either a positive determination is made in step 412 or a positive determination is made in step 414.

When a positive determination is made in step 412, it is judged that ones of ends of each of the register marks 30A, 30B, 30C have been detected within the reading ranges of the scanners 246. The process moves to step 416 where positional data A at the time of detection is taken in. The process then moves to step 418.

In step 418 a determination is made as to whether the other ends of each of the register marks 30A, 30B, 30C, i.e., the boundaries from white areas to black areas of the negative film 12, have been detected. If the answer to the determination in step 418 is "No", the process moves to step 420 where a determination is made as to whether or not the reading areas were overshot by the scanners 246. If the answer to the determination in step 420 is "No", the process moves to step 418. Steps 418, 420 are repeated until either a positive determination is made in step 418 or a positive determination is made in step 420.

When a positive determination is made in step 414 or in step 420, the process moves to step 422 where the variable is incremented. In the next step 424, a determination is made as to whether or not the variable I is greater than or equal to 3. If the answer to the determination in step 424 is "No", the process moves to step 410 in order to try reading again. Further, if the answer in step 424 is "Yes", it is assumed that there is some trouble or the like with the scanners 246 since the register marks 30A, 30B, 30C could not be read in the three attempts. Therefore, the process moves to step 426 where error processing, such as an alarm or a display or the like, is carried out, and the routine is ended.

When a positive determination is made in the above-mentioned step 418, it is judged that the other ends of each of the register marks 30A, 30B, 30C have been detected within the reading ranges of the scanners 246. The process moves to step 428 where positional data B at the time of detection is taken in. The process then moves to step 430.

In step 430, positional data of the centers of each of the register marks 30A, 30B, 30C is obtained by calculating the average values of the positional data A, B.

In step 432, the amount of displacement of the calculated positional data of the center with respect to the proper center is calculated. Next, in step 434, respective correction values for the X directions, the Y directions and the θ directions are calculated. In subsequent step 436, the rod 166A of the cylinder 166 is retracted so that the suction cup supporting board 152 is raised. The process then moves to step 438.

In step 438, the stepping motors 226,226, 240 are successively operated based on the above-mentioned correction amounts so that the moving surface plate 204 is moved. Due to this movement, the negative film 12 moves relatively with respect to the fixed surface plate 206. The appropriate positions in which the punch holes 52A, 52B, 52C are to be formed can thereby be made to correspond to the punch hole forming mechanism portion 250.

When the negative film 12 is positioned by the driving of each of the stepping motors 226, 226, 240, in step 440 negative pressure is supplied to the grooves 206A, 206B of the fixed surface plate 206. The negative film 12 is thereby sucked to and held at the fixed surface plate 206 as well.

In subsequent step 442, the rod 166A of the cylinder 166 is again lowered. The negative film 12 is interposed between the soft sheet 160, which is mounted to the bottom surface of the suction cup supporting board 152, and the surface plate 202. The negative film 12 is pressed to the surface plate 202. In this way, the negative film 12 is reliably maintained at the surface plate 202 without floating or the like occurring. Further, steps 442 and 440 may be reversed such that after the negative film 12 is pressed to the surface plate 202, the negative film 12 is sucked to and held at the fixed surface plate 206.

In this state, the cylinders 256 are driven in step 444. The male puncher blocks 258 are lowered, mesh with the female puncher blocks 248, and are raised. The punch holes 52A, 52B, 52C are thereby formed in the negative film 12.

When the punch holes 52A, 52B, 52C are formed, in step 446 the rod 166A of the cylinder 166 is retracted so that the suction cup supporting board 152 is raised. Next, in step 448 the supply of negative air to the grooves 204A of the moving surface plate 204 and to the grooves 206A, 206B of the fixed surface plate 206 is cancelled. The holding of the negative film 12 to the surface plate 202 is thereby cancelled.

In subsequent step 450, the guide plate 262 is disposed above the female punchers 248A. Next, in step 452, the moving surface plate 204 is returned to its original position (by the driving of the stepping motors 226, 226, 240). In this way, the process of forming punch holes used for positioning in the negative film 12 is completed. In step 454, a processing completion signal is output.

Thereafter, the negative film 12 is transported to the printing portion 22 via the negative film supplying portion 20.

In this way, the punch holes 52A, 52B, 52C are formed in the negative film 12 at uniform positions corresponding to the recorded images. By maintaining the punch holes 52A, 52B, 52C at the pin bar 120 of the printing portion 22, the pin bar 120 can maintain the uniform positions of the images recorded on the negative film 12.

Further, in the second embodiment, a portion of the surface plate 202 (the moving surface plate 204) is moved. However, the surface plate 202 may be moved with respect to the punch hole forming mechanism portion 250. Moreover, the surface plate 202 may be fixed, and the punch hole forming mechanism portion 250 may be moved.

In the second embodiment, pressing means are provided at the transport device 151 which transports the negative film 12 from the stock portion 16 to the punch hole forming portion 200. However, the pressing means may be provided independently above the surface plate 202, or may be provided at means for transporting the negative film 12 from the punch hole forming portion 200 to the film supplying portion 20.

In the present embodiment, the plate material printing apparatus 10, at which images recorded on the negative film 12 are printed onto the PS plate 14, is described. However, the present embodiment is not limited to the same and can be applied to a photosensitive material printing apparatus in which images recorded on a film are registered at predetermined positions of a photosensitive material and are printed. For example, the present embodiment can be applied to registering of color images at a inspection plate producing apparatus during color printing, or can be applied to matching images at an automatic photocomposer or the like. Further, when using original film, the present embodiment can be applied to positive film. The present embodiment can be used for either negative types or positive types of photosensitive materials.

As described above, in the photosensitive material printing apparatus relating to the present invention, by input from an exterior source, images recorded on an original film can be disposed at arbitrary positions on a photosensitive material positioned at a printing portion. In this way, even if printing is effected in parallel by a plurality of photosensitive material printing apparatuses, the differences between the photosensitive material printing apparatuses can be substantially eliminated. Further, the photocomposition pitch can be set arbitrarily when a plurality of images is printed onto the photosensitive material in succession.

Moreover, in the photosensitive material printing apparatus of the present invention, punch holes, which are references for positioning the original film at the printing portion, can be formed at a predetermined position corresponding to the image areas of the original film. As a result, the substantial differences in the position of images to be printed at the printing portion among photosensitive material printing apparatuses can be eliminated. Even if the printed photosensitive material is used in color printing, out of registration in color on prints can be avoided.

In this way, an excellent result can be achieved in that substantial differences between photosensitive material printing apparatuses can be eliminated. Therefore, a printing plate for printing color images can be produced by a plurality of photosensitive material printing apparatuses, and work can be performed efficiently.

What is claimed is:

1. A photosensitive material printing apparatus equipped with a printing portion for printing an image of an original film onto a photosensitive material, comprising:

holding means for holding said original film at a predetermined position with respect to said photosensitive material;

moving means for moving said holding means along a photosensitive surface of said photosensitive material;

input means for inputting an amount of movement of said holding means so as to move said original film to said predetermined position; and control means for controlling said moving means so as to move said holding means based on the amount of movement input by said input means.

2. A photosensitive material printing apparatus according to claim 1, wherein said holding means is at least two positioning pins which are tightly inserted respectively into at least two through-holes spaced at fixed intervals and provided so as to correspond to a position of the image of said original film.

3. A photosensitive material printing apparatus according to claim 2, wherein said photosensitive material is a lithographic printing plate.

4. A photosensitive material printing apparatus equipped with a printing portion for printing an image of an original film onto a photosensitive material, comprising:

holding means for holding said original film at a predetermined position of said printing portion;

moving means for moving said holding means along a photosensitive surface of said photosensitive material;

input means for inputting an amount of movement of said holding means; and control means for controlling said moving means so as to move said holding means based on the amount of movement input by said input means, wherein said moving means is equipped with a first moving device which moves said holding means in a first direction and a second moving device which moves said holding means in a second direction orthogonal to said first direction, said second moving device being able to shift said holding means.

5. A photosensitive material printing apparatus equipped with a printing portion for printing an image of an original film onto a photosensitive material, comprising:

holding means for holding said original film at a predetermined position of said printing portion;

moving means for moving said holding means along a photosensitive surface of said photosensitive material;

input means for inputting an amount of movement of said holding means; and control means for controlling said moving means so as to move said holding means based on the amount of movement input by said input means, wherein said moving means is equipped with a first moving device which moves said holding means in a first direction and a second moving device which moves said holding means in a second direction orthogonal to said first direction, said second moving device being able to shift said holding means in a rotating manner, and wherein said second moving device is formed so as to shift said holding means in a rotating manner while moving said holding means in said second direction.

6. A photosensitive material printing apparatus equipped with a printing portion for printing an image of an original film onto a photosensitive material, comprising:

holding means for holding said original film at a predetermined position with respect to said photosensitive material;

moving means for moving said holding means relatively along a photosensitive surface of said photosensitive material; and control means for controlling said moving means to move said holding means based on an amount of the deviation of the image area to be printed on said photosensitive material, which has been experimentally obtained in advance, from the standard image area on said photosensitive material so as to move said original film to said predetermined position.

7. A photosensitive material printing apparatus according to claim 6, wherein said control means controls the movement of said moving means to eliminate said amount of the deviation.

8. A photosensitive material printing apparatus according to claim 6, wherein said holding means is at least two positioning pins which are tightly inserted respectively into at least two through-holes spaced at fixed intervals and provided so as to correspond to a position of the image of said original film.

9. A photosensitive material printing apparatus according to claim 6, further comprising an input means for inputting said amount of the deviation.

10. A photosensitive material printing apparatus equipped with a printing portion for printing an image of an original film onto a photosensitive material, comprising:

holding means for holding said original film at a predetermined position of said printing portion;

moving means for moving said holding means relatively along a photosensitive surface of said photosensitive material; and control means for controlling said moving means to move said holding means based on an amount of the deviation of the image area to be printed on said photosensitive material, which has been experimentally obtained in advance, from the standard image area on said photosensitive material, wherein said moving means is equipped with a first moving device which moves said holding means in a first direction and a second moving device which moves said holding means in a second direction orthogonal to said first direction, said second moving device being able to shift said holding means in a rotating manner.

11. A photosensitive material printing apparatus equipped with a printing portion for printing an image of an original film onto a photosensitive material, comprising:

holding means for holding said original film at a predetermined position of said printing portion;

moving means for moving said holding means relatively along a photosensitive surface of said photosensitive material; and control means for controlling said moving means to move said holding means based on an amount of the deviation of the image area to be printed on said photosensitive material, which has been experimentally obtained in advance, from the standard image area on said photosensitive material, wherein said moving means is equipped with a first moving device which moves said holding means in a first direction and a second moving device which moves said holding means in a second direction orthogonal to said first direction, said second moving device being able to shift said holding means in a rotating manner, wherein said second moving device is formed so as to shift said holding means in a rotating manner while moving said holding means in said second direction.

12. A photosensitive material printing apparatus according to claim 8, wherein said photosensitive material is a lithographic printing plate.

13. A photosensitive material printing apparatus equipped with a printing portion for printing, onto a photosensitive material, an image recorded on an original film, on which the image and at least one index showing an image area are recorded, comprising:

a loading plate disposed upstream of said printing portion and on which said original film is loaded before being transported to said printing portion;

loading plate moving means for moving at least one portion of said loading plate, with said original film loaded thereon, in horizontal directions;

detecting means for detecting said at least one index of said original film on said loading plate;

loading plate moving means control means for controlling said loading plate moving means based on said at least one index of said original film detected by said detecting means so as to position said original film at a predetermined position; and punching means provided on or adjacent to said loading plate, and punching punch holes in said original film positioned at said predetermined position.

14. A photosensitive material printing apparatus according to claim 13, wherein said loading plate is equipped with a movable portion, which is positioned at a central portion of said loading plate, and a fixed portion, which is positioned at a peripheral portion of said loading plate, said punching means being provided at said fixed portion, and said movable portion being moved with respect to said fixed portion by said loading plate moving means.

15. A photosensitive material printing apparatus according to claim 13, wherein pressing means comprising an elastic body is provided above said loading plate so as to be disposed parallel to an upper surface of said loading plate, a substantially entire surface of said original film being interposed between said loading plate and said pressing means by a downward movement of said pressing means.

16. A photosensitive material printing apparatus according to claim 15, wherein said pressing means is provided at a transporting means for transporting said original film onto said loading plate.

17. A photosensitive material printing apparatus according to claim 14, wherein said movable portion is equipped with a suction means for sucking and holding said original film.

18. A photosensitive material printing apparatus according to claim 13, further comprising:

holding means for holding said original film at a predetermined position of said printing portion;

moving means for moving said holding means along a photosensitive surface of said photosensitive material;

input means for inputting an amount of movement of said holding means; and control means for controlling said moving means to move said holding means based on the amount of movement input by said input means.

19. A photosensitive material printing apparatus equipped with a printing portion for printing, onto a photosensitive material, an image recorded on an original film, on which the image and at least one index showing an image area are recorded, comprising:

a loading plate disposed upstream of said printing portion and on which said original film is loaded before being transported to said printing portion;

punching means provided on or adjacent to said loading plate, and punching punch holes in said original film on said loading plate;

relative moving means for moving in horizontal directions at least one of at least one portion of said loading plate and said punching means, so as to relatively move said at least one portion of said loading plate and said punching means;

detecting means for detecting said at least one index of said original film on said loading plate;

relative moving means control means for controlling said relative moving means based on said at least one index of said original film detected by said detecting means so as to position said original film at a predetermined position;

punching means operating means for operating said punching means to punch holes in said original film positioned at said predetermined position; and holding means having positioning pins, wherein said positioning pins are inserted in said holes punched in said original film so that said original film is held at a predetermined position of said printing portion.

20. A photosensitive material printing apparatus according to claim 19, wherein said loading plate is equipped with a movable portion, which is positioned at a central portion of said loading plate, and a fixed portion, which is positioned at a peripheral portion of said loading plate, said punching means being provided at said fixed portion, and said movable portion being moved with respect to said fixed portion by said relative moving means.

21. A photosensitive material printing apparatus according to claim 19, wherein pressing means formed by an elastic body is provided above said loading plate so as to be disposed parallel to an upper surface of said loading plate, a substantially entire surface of said original film being interposed between said loading plate and said pressing means by a downward movement of said pressing means.

22. A photosensitive material printing apparatus according to claim 21, wherein said pressing means is provided at transporting means for transporting said original film onto said loading plate.

23. A photosensitive material printing apparatus according to claim 20, wherein said movable portion is equipped with a suction means for sucking and holding said original film.

24. A photosensitive material printing apparatus according to claim 19, further comprising:

holding means for holding said original film at a predetermined position of said printing portion;

moving means for moving said holding means along a photosensitive surface of said photosensitive material;

input means for inputting an amount of movement of said holding means; and control means for controlling said moving means to move said holding means based on the amount of movement inputted by said input means.

* * * * *